United States Patent
Bauman et al.

(10) Patent No.: US 6,279,098 B1
(45) Date of Patent: Aug. 21, 2001

(54) METHOD OF AND APPARATUS FOR SERIAL DYNAMIC SYSTEM PARTITIONING

(75) Inventors: Mitchell A. Bauman, Circle Pines; Lewis A. Boone, Fridley; Donald E. Schroeder, White Bear Lake, all of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 08/767,455

(22) Filed: Dec. 16, 1996

(51) Int. Cl.[7] ............................... G06F 15/00; G06F 9/00
(52) U.S. Cl. ............................... 712/13; 712/15; 712/28; 709/104; 709/201; 710/71
(58) Field of Search ............................... 712/1, 4, 13, 15, 712/28, 29, 31, 38, 39; 370/206, 282, 366, 466; 709/201, 102, 104; 710/71

(56) References Cited

U.S. PATENT DOCUMENTS

| | | |
|---|---|---|
| 3,641,505 | 2/1972 | Artz et al. .......................... 340/172.5 |
| 3,699,532 * | 10/1972 | Schaffer et al. . |
| 3,812,469 | 5/1974 | Hauck et al. ...................... 340/172.5 |
| 3,872,447 | 3/1975 | Tessera et al. .................... 340/172.5 |
| 4,056,844 | 11/1977 | Izumi ................................... 364/200 |
| 4,070,704 | 1/1978 | Calle et al. ........................... 364/200 |
| 4,130,865 | 12/1978 | Heart et al. .......................... 364/200 |
| 4,245,306 | 1/1981 | Besemer et al. ..................... 364/200 |
| 4,349,871 | 9/1982 | Lary ................................... 364/200 |
| 4,426,681 | 1/1984 | Bacot et al. ......................... 364/200 |
| 4,437,157 | 3/1984 | Witalka et al. ...................... 364/200 |
| 4,442,487 | 4/1984 | Fletcher et al. ..................... 364/200 |
| 4,525,777 | 6/1985 | Webster et al. ...................... 364/200 |
| 4,607,345 * | 8/1986 | Mehta ................................. 364/200 |
| 4,667,288 | 5/1987 | Kelley et al. ......................... 364/200 |
| 4,755,930 | 7/1988 | Wilson, Jr. et al. ................. 364/200 |
| 4,761,775 | 8/1988 | Ardini, Jr. et al. ................. 364/749 |
| 4,794,521 | 12/1988 | Ziegler et al. ...................... 364/200 |
| 4,807,110 | 2/1989 | Pomerene et al. ................... 364/200 |

(List continued on next page.)

OTHER PUBLICATIONS

Wilson, Jr., "Hierarchical Cache/Bus Architecture for Shared Memory Multiprocessors", IEEE Computer Society, 1987, pp. 244–252.

Sparacio, "Data Processing System with Second Level Cache", IBM Technical Disclosure Bulletin, vol. 21, No. 6, Nov. 1978, pp. 2468–2469.

Dubois, et al., "Effects of Cache Coherency in Multiprocessors", *IEEE Transactions on Computers*, vol. 31, No. 11, Nov. 1982, pp. 1083–1099.

Bandyopadhyay et al., "Combining Both Micro–Code and Hardwired Control in RISC", *Computer Architecture News*, Sep. 1987.

Hinton et al., "Microarchitecture of the 80960 High–Integration Processors", Proceedings of the 1988 IEEE International Conference on Computer Design: VLSI in Computers and Processors, 1988, pp. 362–365.

Myers et al., The 80960 Microprocessor Architecture, John Wiley & Sons, Inc., Copyright 1988, pp. 159–185.

Bandyopadhyay et al., "Micro–Code Based RISC Architecture", 19th Southeastern Symposium on System Theory, Mar. 1987, pp. 411–414.

*Primary Examiner*—Eddie Chan
*Assistant Examiner*—Dzung C. Nguyen
(74) *Attorney, Agent, or Firm*—Charles A. Johnson; Mark T. Starr; Nawrocki, Rooney & Sivertson, P.A.

(57) ABSTRACT

A method and apparatus for providing for serially transmitting partitioning information between system partitions, and between system partitions and the corresponding data processing resources. Serial transmission may allow the partitioning information to be transmitted using a single I/O ASIC pin, and a single PC board trace. In addition to reducing the required number of I/O ASIC pins and PC board traces, the present invention may increase the overall reliability of the partitioning mechanism.

16 Claims, 19 Drawing Sheets

U.S. PATENT DOCUMENTS

| | | | |
|---|---|---|---|
| 4,811,277 | * 3/1989 | May et al. | 370/94 |
| 4,843,541 | 6/1989 | Bean et al. | 364/200 |
| 4,843,542 | 6/1989 | Dashiell et al. | 364/200 |
| 4,860,192 | 8/1989 | Sachs et al. | 364/200 |
| 4,868,818 | 9/1989 | Madan et al. | 371/11.3 |
| 4,888,771 | 12/1989 | Benignus et al. | 371/16.1 |
| 4,891,810 | 1/1990 | de Corlieu et al. | 371/9.1 |
| 4,979,107 | 12/1990 | Advani et al. | 364/200 |
| 4,984,153 | 1/1991 | Kregness et al. | 364/200 |
| 4,992,930 | 2/1991 | Gilfeather et al. | 364/200 |
| 4,992,934 | 2/1991 | Portanova et al. | 364/200 |
| 4,995,035 | 2/1991 | Cole et al. | 370/95.2 |
| 5,014,197 | 5/1991 | Wolf | 364/200 |
| 5,023,776 | 6/1991 | Gregor | 364/200 |
| 5,025,365 | 6/1991 | Mathur et al. | 364/200 |
| 5,025,366 | 6/1991 | Baror | 364/200 |
| 5,058,006 | 10/1991 | Durdan et al. | 364/200 |
| 5,113,522 | 5/1992 | Dinwiddie, Jr. et al. | 395/700 |
| 5,125,081 | 6/1992 | Chiba | 395/325 |
| 5,129,077 | 7/1992 | Hillis | 395/500 |
| 5,136,696 | 8/1992 | Beckwith et al. | 395/375 |
| 5,144,692 | * 9/1992 | Baker et al. | 395/728 |
| 5,148,533 | 9/1992 | Joyce et al. | 395/425 |
| 5,150,363 | * 9/1992 | Mitchell | 370/282 |
| 5,161,102 | 11/1992 | Griffin et al. | 395/800 |
| 5,165,018 | 11/1992 | Simor | 395/300 |
| 5,170,472 | 12/1992 | Cwiakala et al. | 395/275 |
| 5,193,163 | 3/1993 | Sanders et al. | 395/425 |
| 5,206,933 | * 4/1993 | Farrell et al. | 395/200 |
| 5,222,244 | 6/1993 | Carbine et al. | 395/800 |
| 5,253,344 | 10/1993 | Bostick et al. | 395/275 |
| 5,265,257 | 11/1993 | Simco et al. | 395/725 |
| 5,276,848 | 1/1994 | Gallagher et al. | 395/425 |
| 5,280,474 | 1/1994 | Nickolls et al. | 370/60 |
| 5,313,602 | 5/1994 | Nakamura | 395/425 |
| 5,444,847 | * 8/1995 | Iitsuka | 385/287 |
| 5,452,239 | 9/1995 | Dai et al. | 364/578 |
| 5,469,542 | * 11/1995 | Foster et al. | 395/200.01 |
| 5,559,971 | * 9/1996 | Hsieh et al. | 395/312 |
| 5,588,122 | * 12/1996 | Garcia | 395/872 |
| 5,678,058 | * 10/1997 | Sato | 712/7 |
| 5,687,326 | * 11/1997 | Robinson | 395/285 |
| 5,832,303 | * 11/1998 | Murase et al. | 710/36 |

* cited by examiner

LOCAL SCI PARTITIONING REGISTER — 238

| BIT | DESCRIPTION |
|---|---|
| 0 | IP-0 AVAIL |
| 1 | IP-0 EN |
| 2 | IP-1 AVAIL |
| 3 | IP-1 EN |
| 4 | IP-2 AVAIL |
| 5 | IP-2 EN |
| 6 | IP-3 AVAIL |
| 7 | IP-3 EN |
| 8 | SC AVAIL |
| 9 | REM SC EN |
| 10 | MSU-0 EN |
| 11 | MSU-1 EN |
| 12 | MSU-2 EN |
| 13 | UN-USED |
| 14 | UN-USED |
| 15 | UN-USED |

300 ↱    ↰ 302

SA ASIC PARTITIONING REGISTER — 242

| 0 | 1 | 2 | 3 | 4 | 5 | 6 | 7 | 8 | 9 | 10 | 11 | 12 | 13 | 14 | 15 |

310

| BIT | DESCRIPTION | LOGIC DEFINITION | | | |
|---|---|---|---|---|---|
| | | | AND | AND | AND |
| 0 | LOC IP-0 PART | LOC IP-0 AVAIL | LOC IP-0 EN | | |
| 1 | LOC IP-1 PART | LOC IP-1 AVAIL | LOC IP-1 EN | | |
| 2 | LOC IP-2 PART | LOC IP-2 AVAIL | LOC IP-2 EN | | |
| 3 | LOC IP-3 PART | LOC IP-3 AVAIL | LOC IP-3 EN | | |
| 4 | REM IP0 PART | LOC REM SC EN | REM SC AVAIL | REM IP-0 AVAIL | REM IP-0 EN |
| 5 | REM IP1 PART | LOC REM SC EN | REM SC AVAIL | REM IP-1 AVAIL | REM IP-1 EN |
| 6 | REM IP2 PART | LOC REM SC EN | REM SC AVAIL | REM IP-2 AVAIL | REM IP-2 EN |
| 7 | REM IP3 PART | LOC REM SC EN | REM SC AVAIL | REM IP-3 AVAIL | REM IP-3 EN |
| 8 | LOC SC AVAIL | LOC SC AVAIL | | | |
| 9 | REM SC PART | LOC REM SC EN | REM SC AVAIL | | |
| 10 | MSU-1 EN | LOC MSU-0 EN | | | |
| 11 | MSU-2 EN | LOC MSU-1 EN | | | |
| 12 | MSU-3 EN | LOC MSU-2 EN | | | |
| 13 | UN-USED | | | | |
| 14 | UN-USED | | | | |
| 15 | UN-USED | | | | |

METHOD OF AND APPARATUS FOR SERIAL DYNAMIC SYSTEM PARTITIONING

CROSS REFERENCE TO CO-PENDING APPLICATIONS

The present application is related to U.S. patent application Ser. No. 08/364,760, now U.S. Pat. No. 5,603,005, filed Dec. 27, 1994, entitled "Cache Coherency Scheme for Xbar Storage Structure", and U.S. patent application Serial No. 07/762,282, filed Sep. 19, 1991, entitled "Cooperative Hardware and Microcode Control System for Pipelined Instruction Execution", and U.S. patent application Ser. No. 08/302,381, now U.S. Pat. No. 5,574,914 filed Sep. 8, 1994, entitled "Site Configuration Management System", and U.S. patent application Ser. No. 08/235,196, filed Apr. 29, 1994, entitled "Data Coherency Protocol for Multi-Level Cached High Performance Multiprocessor System" (which is a continuation of U.S. patent application Ser. No. 07/762,276, filed on Sep. 19, 1991), all assigned to the assignee of the present invention and all incorporated herein by reference.

BACKGROUND OF THE INVENTION

1. Field of the Invention

The present invention generally relates to multi-processor systems and more particularly relates to multiple-processor systems which utilize partitioning schemes.

2. Description of the Prior Art

Ever increasing demand for high throughput data processing systems has caused computer designers to develop sophisticated multi-processor designs. Initially, additional processors were provided to improve the overall bandwidth of the system. While the additional processors provided some level of increased performance, it became evident that further improvements were necessary particularly in the area system partitioning. Improved system partitioning schemes were necessary to optimize the parallel nature of such systems and to efficiently manage the growing number of processors included therein.

Partitioning of a system refers to the allocation of the system's data processing resources to a number of predefined "partitions". Each partition may operate independently from the other partitions in the system. That is, partitioning may allow a number of parallel tasks to be independently executed within the system. For example, a first portion of the system resources may be allocated to a first partition to process a first task while a second portion of the system resources may be allocated to a second partition to process a second task.

A system controller may control the addition or deletion of the system resources to or from the various partitions in the system. That is, the system resources that are allocated to a particular partition may be added or deleted therefrom depending on the type of task performed by that partition. For example, a large task may require more system resources than a small task. A system controller may add resources to the partition of the system servicing the large task, and may delete resources from a partition servicing a smaller task, thereby increasing the efficiency of the overall system.

A major step in dynamic resource allocation was to provide input/output subchannels with the capability of dynamic allocation as taught in U.S. Pat. No. 4,437,157, issued to Witalka et al. Logical file designations for peripheral devices is suggested by U.S. Pat. No. 5,014,197, issued to Wolf. Similarly, U.S. Pat. No. 4,979,107, issued to Advani et al., suggests logical assignment of peripheral subsystem operating parameters.

The capability to reconfigure has been used in a number of systems applications, U.S. Pat. No. 4,070,704, issued to Calle et al., provides a boot strap program with the capability to change the initial load peripheral device upon determination of a failure in the primary loading channel. Perhaps the most often stated purpose for reconfiguration is to provide some degree of fault tolerance. U.S. Pat. No. 4,891,810, issued to de Corlieu et al., and U.S. Pat. No. 4,868,818, issued to Madan et al., suggest system reconfiguration for that reason. A related but not identical purpose is found in U.S. Pat. No. 4,888,771, issued to Benignus et al., which reconfigures for testing and maintenance.

The capability to reconfigure a data processing system can support centralized system control as found in U.S. Pat. No. 4,995,035, issued to Cole, et al. A current approach is through the assignment of logical names for resources as found in U.S. Pat. No. 4,245,306, issued to Besemer et al. and U.S. Pat. No. 5,125,081, issued to Chiba. An extension of the capability to identify resources by logical names is a virtual system in which the user need not be concerned with physical device limitations, such as suggested in U.S. Pat. No. 5,113,522, issued to Dinwiddie, Jr. et al.

In many systems, the system controller maintains overall control over the partitioning of the system. Thus, the system controller is typically in communication with each of the partitions within the system. For example, the system controller may provide each of the partitions with a number of partitioning bits, indicating which of the data processing resources are available for use thereby. Both processors and storage structures may be the subject of system partitioning. That is, a number of processors within the system may be allocated to a first partition while the remaining processors may be allocated to a second partition. Similarly, a number of storage structures may be allocated to the first partition while the remaining storage structures may be allocated to the second partition.

To support dynamic partitioning, or partitioning on-the-fly, each of the partitions within the system are often in communication with all other partitions. That is, each partition may dynamically transmit it's partitioning information to all other partitions within the system, thereby indicating which resources are associated therewith. Further, each partition may make dynamic requests for additional resources from the other partitions. Finally, each partition may be in communication with each of the data processing resources associated therewith. All of these control signals are typically provided using a parallel bus type interface.

Using a parallel bus type interface to transmit and receive the partition information between partitions, and between the partitions and the associated data processing resources, may consume a relatively large number of I/O pins on a corresponding ASIC (Application Specific Integrated Circuit), and a relatively large number of PC board traces. It is known that as technology progresses to larger scale integration, the number of I/O pins that are available on an ASIC may not grow proportionately with the logic space available on the component. Thus, the I/O pins have become a valuable resource. Further, it is known that the failure rate of the I/O pins on an ASIC is higher than the failure rate of the logic used to transmit the information. Finally, the number of PC board traces required for a particular design often limits the size of the corresponding PC board. It can readily be seen that using a parallel bus type interface to transmit and receive partition information may increase the number of I/O pins required, reduce the reliability of the partitioning mechanism, and may increase the overall size of a corresponding PC board design.

SUMMARY OF THE INVENTION

The present invention overcomes many of the limitations found in the prior art by providing a method and apparatus for serially transmitting partitioning information between system partitions, and between system partitions and the corresponding data processing resources. Serial transmission may allow the partitioning information to be transmitted using a single I/O ASIC pin, and a single trace on each PC board. In addition to reducing the required number of I/O ASIC pins and PC board traces, the present invention may increase the overall reliability of the partitioning mechanism.

In a preferred embodiment of the present invention, each of the partitions may be controlled by a partition controller. Each of the partition controllers may be in communication with a maintenance processor (i.e. support processor) as described above. To support the serial transmission of the partition information, the present invention contemplated providing a first serial interface coupling a first one of the partition controllers with a second one of the partition controllers, such that partitioning information may be serially transmitted from the second partition controller to the first partition controller via the first serial interface. A second serial interface may be provided between the first one of the partition controllers and the second one of the partition controllers, such that partitioning information may be serially transmitted from the first partition controller to the second partition controller via the second serial interface. Alternatively, it is contemplated that a single serial interface may be provided between the first and second one of the partition controllers, wherein the single interface may provide two-way serial communication therebetween using a time-division-multiplexed (TDM) algorithm.

In addition to the above, it is contemplated that each of the partition controllers may be in serial communication with each of the data processing resources associated therewith. Accordingly, it is contemplated that the partitioning information received by a first partition controller from a second partition controller may be passed on to selected ones of the data processing resources that are associated with the first partition controller. For purposes of the following discussing, the first and second partitioning controllers may be considered a local and remote partitioning controller, respectively.

In a preferred embodiment, a first logical combining block may be provided in the local partition controller to logically combine local partitioning information with the remote partitioning information received from the remote partition controller. This may be useful to "process" the partitioning information before passing the results to a selected data processing resources via a serial interface, thereby potentially reducing the number of partitioning bits that must be provided to the data processing resource over the serial interface.

Similarly, it is contemplated that the local partition controller may include a second logical combining block to logically combine selected local partitioning bits with one another and/or with other predetermined data bits before serially transmitting the result to the remote partition controller. This may be useful to "process" the local partitioning information before providing the result to the remote partitioning controller, thereby potentially reducing the number of partitioning bits that must be provided to the remote partitioning controller via the corresponding serial interface.

Finally, it is contemplated that the partitioning information may be continuously transmitted from the local partitioning controller to the remote partitioning controller, and visa-versa. It is also contemplated that the partitioning information received by each of the partitioning controllers may be continuously transmitted to selected data processing resources. An advantage of continuously transmitting the partitioning information is that each partition and data processing resource within the system may be updated as soon as possible. Further, no control circuitry is needed to determine when the partitioning information should be transmitted, because the partitioning information is transmitted continuously. It is contemplated that the serial interfaces may be controlled by a counter or other control means located on each end of the serial interfaces.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 7 is a table showing the SA ASIC partitioning register, and the bit descriptions therefor;

DETAILED DESCRIPTION OF THE PREFERRED EMBODIMENTS

Figure 1:
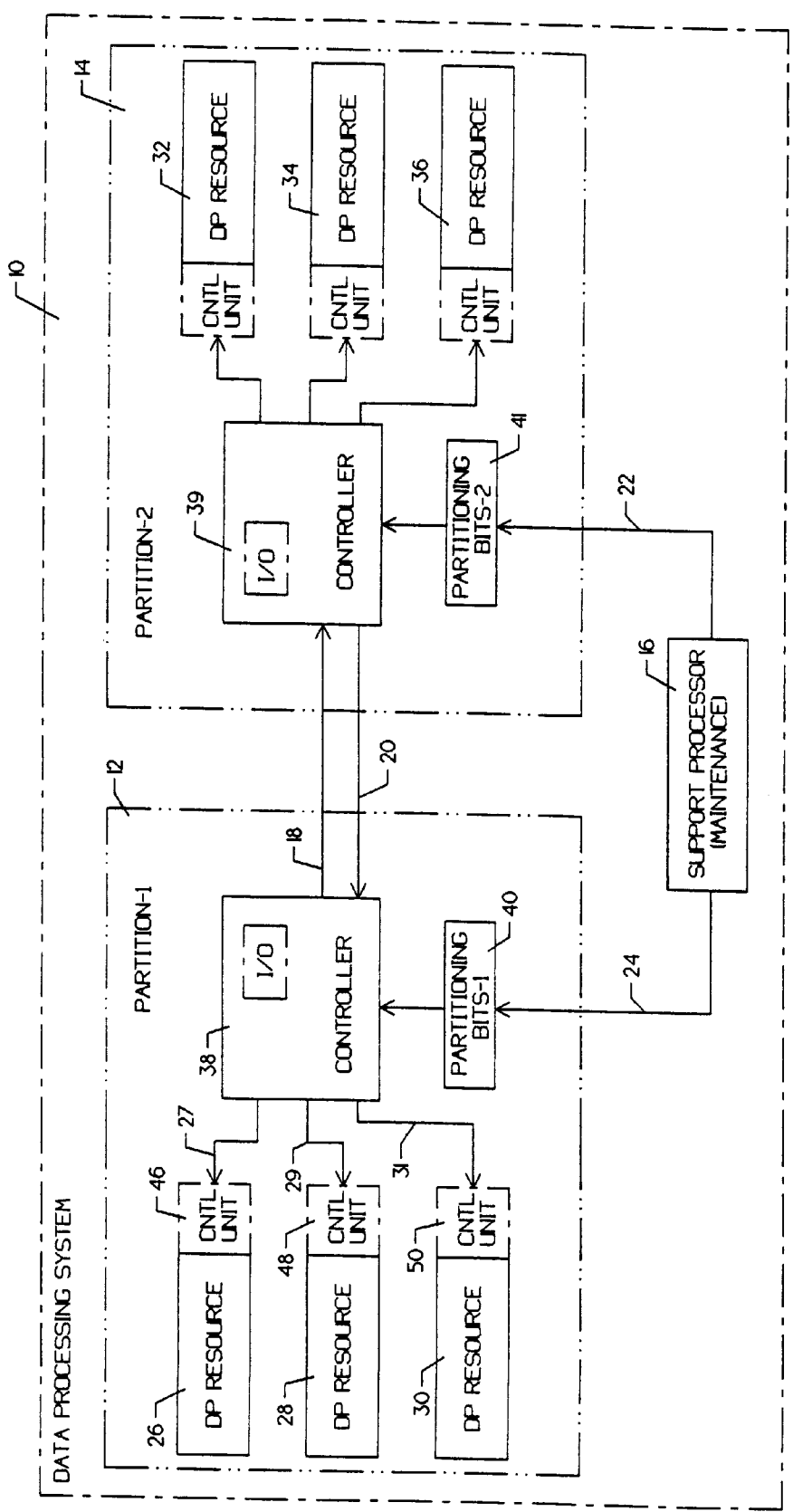
FIG. 1 is a schematic diagram of a data processing system in accordance with an exemplary embodiment of the present invention.

FIG. 1 is a schematic diagram of a data processing system in accordance with the exemplary embodiment of the present invention. The data processing is shown at 10 and includes a first partition 12 and a second partition 14. The first partition 12 may be coupled to the second partition 14 via a serial interface 18, wherein partitioning information may be serially transmitted between the first partition 12 and the second partition 14. It is contemplated that the serial interface 18 may provide one-way serial communication between the first partition 12 and the second partition 14 or two-way serial communication using a time-division-multiplexed (TDM) algorithm. In a preferred embodiment, serial interface 18 provides serial communication from the first partition 12 to the second partition 14. A second serial interface 20 may be provided to provide serial communication from the second partition 14 to the first partition 12. The first partition 12 may include a controller 38, and the second partition 14 may include a controller 39. Controller 38 and controller 39 may control the serial communication between the first partition 12 and the second partition 14 over serial interfaces 18 and 20.

Each of the partitions within the data processing system may have a number of data processing resources associated therewith. For example, the first partition 12 has data processing resources 26, 28 and 30 associated therewith. Likewise, the second partition 14 has data processing resources 32, 34 and 36 associated therewith. Controller 38 of the first partition 12 may be coupled to each of the data processing resources 26, 28 and 30 via serial interfaces 27, 29 and 31, respectively. it is contemplated that the partitioning information received by controller 38 from controller 39 via interface 20 may be serial transmitted to selected ones of the data processing resources 26, 28 and 30 via the serial interfaces 27, 29 and 31, respectively. For purposes of the following discussion, controller 38 may be considered a local partitioning controller, and controller 39 may be considered a remote partitioning controller. Likewise, the first partition 12 may be considered a local partition, while the second partition 14 may be considered a remote partition.

Each of the partitions 12 and 14 may include a number of partitioning bits, wherein the partitioning bits may indicate which of the data processing resources are available for use thereby. For example, local partition 12 may store partitioning bits 40, wherein partitioning bits 40 may indicate which of the data processing resources within the local partition 12 are associated with the local partition 12. Likewise, the remote partition 14 may store partitioning bits 41, wherein partitioning bits 41 may indicate which of the data processing resources within the remote partition 14 are associated with the remote partition 14. In a preferred embodiment, the partitioning bits 40 and 41 are set by a support processor (maintenance) 16. Support processor 16 may generally control the partitioning of the data processing system 10 via a user interface (not shown).

During operation, and at system initialization, the support processor 16 may provide partitioning bits 40 and 41 to local partition 12 and remote partition 14, respectively. The partitioning bits 40 and 41 may then be provided to controllers 38 and 39, respectively. In the illustrative embodiment, partitioning bits 40 indicate to controller 38 that data processing resources 26, 28 and 30 are associated with the local partition 12. Similarly, partitioning bits 41 indicate to controller 39 that data processing resources 32, 34 and 36 are associated with remote partition 14. in a preferred embodiment, by changing the partitioning bits 40, data processing resources 26, 28 and 30 may each be associated or disassociated with local partition 12. Likewise, by changing the partitioning bits 41, data processing resources 32, 34 and 36 may be associated or disassociated with remote partition 14. Finally, it is contemplated that by changing the partitioning bits 40 and 41 appropriately, data processing resource 30, for example, may be associated with remote partition 14.

Each of the data processing resources may have a control unit associated therewith for controlling the serial transmission of data between the data processing resource and the corresponding controller. For example, data processing resources 26, 28 and 30 may have control units 46, 48 and 50, respectively, associated therewith. A further discussion of the serial transmission algorithm used to transmit data between the controller and the corresponding data processing resources can be found below. The serial transmission algorithm used for data transmission between two controllers is also discussed in more detail below.

Figure 2:
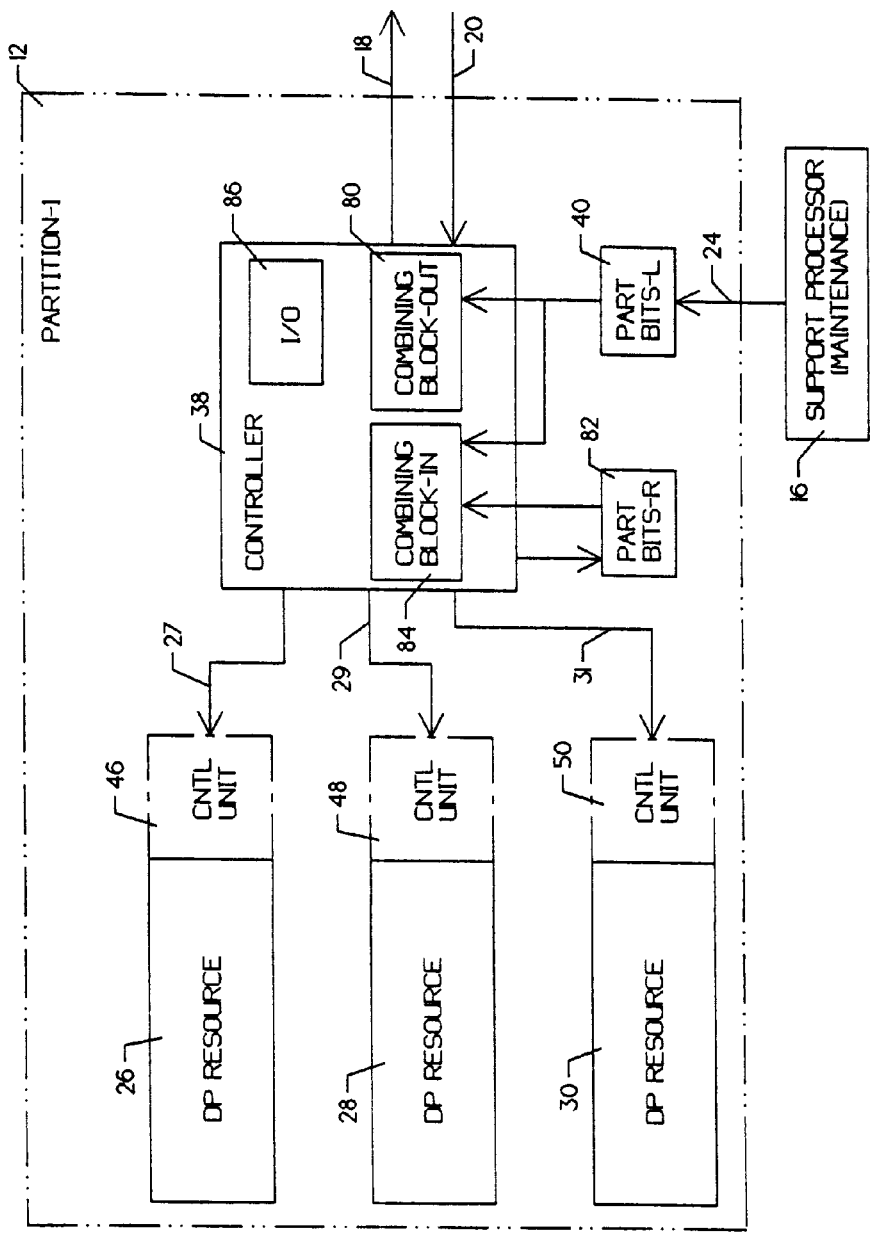
FIG. 2 is a schematic diagram of the first partition of FIG. 1, showing a combine block-in and a combine block-out.

FIG. 2 is a schematic diagram of the first partition of FIG. 1 showing a combining block-in and a combining block-out block. As indicated above, the first partition (local partition) 12 includes a controller 38. In the illustrative embodiment, controller 38 includes a combining block-in 84 and a combining block-out 80. The local partitioning bits are shown at 40, and the remote partitioning bits received via interface 20 are shown at 82. in the illustrative embodiment, combining block-out 80 logically combines preselected ones of the local partitioning bits in a predetermined way. Controller 38 then provides the result to the remote partition (for example partition 14) via interface 18. The combining block-in 84 logically combines predetermined ones of the local partitioning bits 40 and predetermined ones of the remote partitioning bits 82 in a predetermined way. Controller 38 may then provide the result to selected ones of the data processing resources 26, 28 and 30 via interfaces 27, 29 and 31, respectively.

Combining block-out 80 may be useful to "process" the local partitioning bits 40 before serially transmitting the result to controller 39 (see FIG. 1). Similarly, combining block-in 84 may be useful to "process" the partitioning information (both local and remote) before passing the result to a selected data processing resource. Both combining blocks 80 and 84 may thus potentially reduce the number of partitioning bits that must be provided over the corresponding serial interfaces, and may increase the speed at which the partitioning information is distributed throughout the system.

Figure 3:
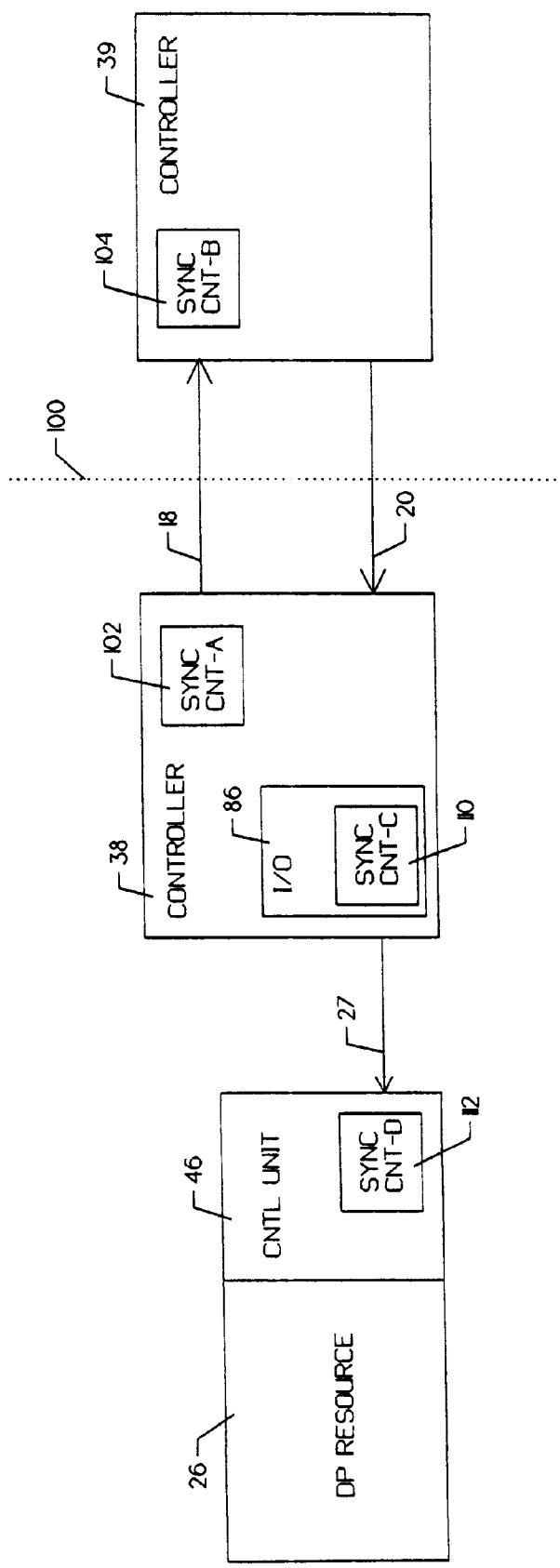
FIG. 3 is a schematic diagram showing a number of serial interfaces for transmitting partitioning information within a system, including a number of synchronization blocks.

FIG. 3 is a schematic diagram showing a number of serial interfaces for transmitting partitioning information within a system, including a number of synchronization blocks. Controller 38 corresponds to controller 38 of FIGS. 1–2, and controller 39 corresponds to controller 39 of FIG. 1. Dashed line 100 indicates the boundary between the local partition on the left and the remote partition on the right.

The serial communication between controller 38 and controller 39 via interface 18 is controlled by synch counter-A 102 and synch counter-B 104. These synch counters synchronize the serial transmission between controller 38 and controller 39 over interface 18. Likewise, the serial transmission between controller 39 and controller 38 via interface 20 is also controlled by synch counter-A 102 and synch counter-B 104. Finally, the serial transmission between controller 38 and data processing resource 26 via interface 27 is controlled by synch counter-C 110 and synch counter-D 112.

It is contemplated that partitioning information may be continuously serially transmitted from controller 38 to controller 39 via interface 18. Further, it is contemplated that partitioning information may be continuously serially transmitted from controller 39 to controller 38 via interface 20. Finally, it is contemplated that partitioning information may be continuously serially transmitted from controller 38 to data processing resource 26 via interface 27. In an illustrative embodiment, the partitioning information transmitted from controller 39 to controller 38 via interface 20 is combined with local partitioning information stored in controller 38 and the result is continuously transmitted to data processing resource 26 via interface 27.

The synch counters may synchronize the serial communication between a partition that is dynamically connected to another partition. For example, the local partition, represented on the left side of the dashed line 100, may be in a first power group, and the remote partition, represented on the right side of the dotted line 100, may be in a second power group. Assuming, for example, that the remote partition is powered up and executing a task and the local partition is powered down and idle. The local partition may then be powered up, and dynamically interfaced with the operating remote partition. In a preferred embodiment, the synch counters in the local partition begin counting when the corresponding remote counter reaches a predetermined value. This may synchronize the serial transmission between the local partition and the remote partition.

Since the partitioning information may be continuously serially transmitted from the remote partition to the local partition, and subsequently continuously serially transmitted from the local partition to a local data processing resource 26, the synchronization counters 110 and 112 must also be synchronized with the synchronization counters 102 and 104. A further discussion of the serial transmission algorithm using synchronization counters can be found below.

Figure 4:
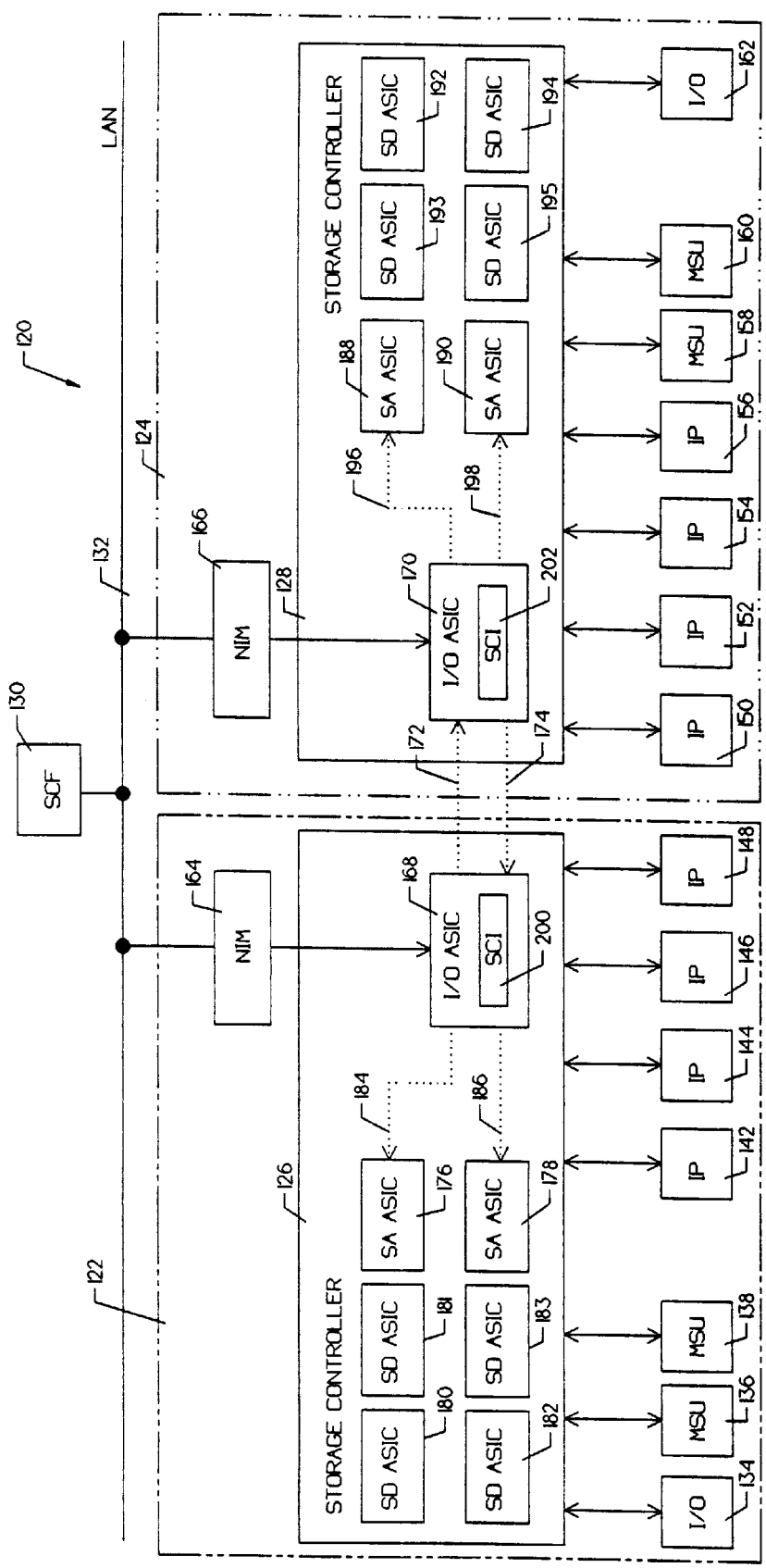
FIG. 4 is a schematic diagram of a data processing system in accordance with another exemplary embodiment of the present invention.

FIG. 4 is a schematic diagram of a data processing system in accordance with a preferred embodiment of the present invention. The diagram is generally shown at 120, wherein a first partition is shown at 122 and a second partition is shown at 124. The first partition includes a storage controller 126, and a number of data processing resources 134, 136, 138, 142, 144, 146 and 148. Similarly, the second partition 124 includes a storage controller 128, and a number of data processing resources 150, 152, 154, 156, 158, 160 and 162.

The storage controller 126 of the first partition 122 may include an I/O ASIC 168, two SA (address) ASICs 176 and 178, and four SD (data) AS!Cs 180, 181, 182 and 183. Similarly, the storage controller 128 of the second partition 124 may include an I/O ASIC 170, two SA (address) ASICs 188 and 190, and four SD (data) ASICs 192, 193, 194 and 195. The first partition 122 and the second partition 124 may be coupled via a first serial interface 172 and a second serial interface 174. The first storage controller 126 may serially transmit partitioning information to the storage controller 128 via interface 172. Similarly, the storage controller 128 may serially transmit Partitioning information to the storage controller 126 via interface 174. I/O ASIC 168 of the first storage controller 126 and the I/O ASIC 170 of storage controller 128 may control the serial communication between the first storage controller 126 and the second storage controller 128.

The I/O ASIC 168 of the first storage controller 126 may further include a system control interface block 200. Similarly, the I/O ASIC 170 of the second storage controller 128 may include a system control interface block 202. The system control interface blocks may include a number of registers and other logic to control the serial transmission between partitions (see FIG. 5).

Each of the I/O ASICs may serially transmit partitioning information to the corresponding SA ASIC blocks, as shown. For example, I/O ASIC 168 may serially transmit partitioning information to SA ASIC 176 and SA ASIC 178 via interfaces 184 and 186, respectively. Similarly, I/O ASIC 170 may serially transmit partitioning information to SA ASIC 188 and SA ASIC 190 via interfaces 196 and 198, respectively. The SA ASICs are coupled to, and may control, the assignment of the associated data processing resources to the corresponding partition. For example, SA ASIC 178 may receive partitioning information from I/O ASIC 168 via interface 186, indicating that IP 148 is to be disassociated with the first partition 122.

It is also contemplated that the SA ASIC 178 may assign IP 148 to the second partition 124. This shows that although the data processing resources 134, 136, 138, 140, 142, 144, 146 and 148 may initially be associated with storage controller 126, selected ones of the data processing resources may either be disassociated from storage controller 126 or even assigned to another storage controller. When the IP 148 is associated with the remote partition, it is contemplated that 1P 148 may be coupled to the second storage controller 128 via a parallel storage-controller to storage-controller data path (not shown). The storage-controller to storage-controller data paths are discussed further in the above-referenced co-pending patent applications that have been incorporated herein by reference.

Each of the storage controllers 126 and 128 may interface with a network interface module (NIM) as shown at 164 and 166. The network interface modules 164 and 166 may transmit and receive maintenance information, including partitioning information, from a system control facility 130 via a local area network (LAI) 132. The system control facility 130 may include a personal computer which may be used by a user to enter the desired partitioning configuration of the system. The system control facility 130 may encode and transmit the appropriate partitioning bits to network interface modules 164 and 166. The network interface modules 164 and 166 may then provide the partitioning information to the corresponding I/O ASICs 168 and 170, respectively.

Figure 5:
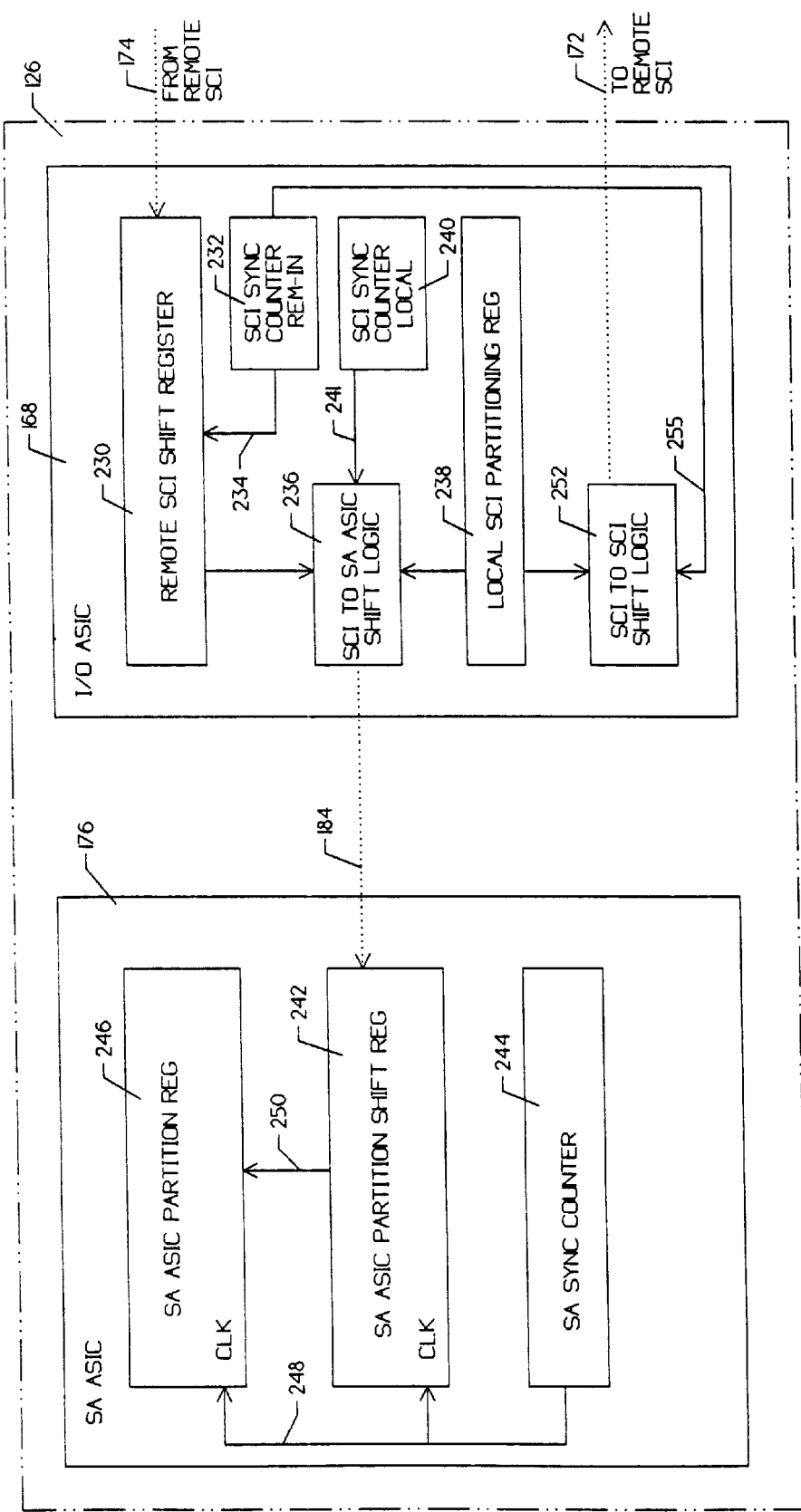
FIG. 5 is a schematic diagram detailing a first partition of the exemplary embodiment shown in FIG. 4.

FIG. 5 is a schematic diagram detailing a first partition of the exemplary embodiment shown in FIG. 4. The first partition is shown at 126, and includes an I/O ASIC 168 and an SA ASIC 176, as shown in FIG. 4. The I/O ASIC 168 may be coupled to the I/O ASIC 170 of the second partition 124 via serial interfaces 172 and 174. The second partition 124 may be similarly configured.

The I/O ASIC 168 may include a remote SCI shift register 230 for receiving serial partitioning data from the remote storage controller interface 202 (see FIG. 4). SCI synch counter remote-in block 232 may provide a synch signal to the remote SCI shift register 230 via interface 234. The SCI synch counter remote-in block 232 may synchronize the remote SCI shift register 230 with the SCI to SCI shift logic block of the storage controller interface 202 of the remote partition 124. A preferred implementation of the remote SCI shift register 230 and the SCI synch counter remote-in block 232 is discussed in further detail with reference to FIG. 11.

The partitioning bits received by remote SCI shift register 230 are provided to an SCI to SA ASIC shift logic block 236 as shown. SCI to SA ASIC shift logic block 236 also receives the local partitioning bits from the local SCI partitioning register 238. The SCI to SA ASIC shift logic block 236 logically combines selected ones of the local partitioning bits and selected ones of the remote partitioning bits, and serially transmits the result to an SA ASIC partitioning shift register 244 via the serial interface 184. A further discussion of the logic provided by the SCI to SA ASIC shift logic block 236 can be found with reference to FIG. 7.

The SA ASIC partitioning shift register 242 is located in the SA ASIC 176 as shown, and is controlled by a SA synch counter 244. The SA synch counter 244 and the SCI synch counter local block 240 may synchronize the serial transmission of the logically combined partitioning data over serial interface 184. In the illustrative embodiment, the logically combined partitioning data received by SA ASIC partitioning shift register 242 are provided to an SA ASIC partitioning register 246 located in the SA ASIC 176. A further discussion of a preferred implementation for the serial data transmission from the I/O ASIC 168 to the SA ASIC 176 may be found with reference to FIGS. 12–14.

To provide the local partitioning bits that are stored in the local SCI partitioning register 238 to the remote storage controller interface 202, the present invention contemplates using an SCI to SCI shift logic block 252 and the SCI synch counter remote-in block 232, as shown. A preferred implementation for the local SCI partitioning register is discussed with reference to FIG. 6. The SCI to SCI shift logic block 252 logically combines selected local partitioning bits and transmits the results to the remote storage controller interface 202 via interface 172. A further discussion of a preferred implementation of the SCI to SCI shift logic block 252 and the SCI synch counter remote-in block 232 can be found with reference to FIGS. 8–10.

Figure 6:
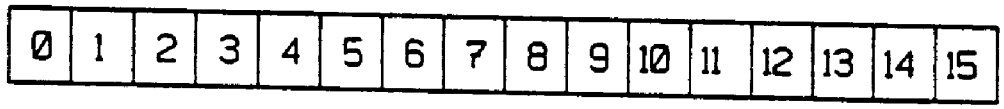
FIG. 6 is a table showing the local partitioning register and the bit descriptions therefor.

FIG. 6 is a table showing a local partitioning register and illustrative bit descriptions therefore. In the preferred embodiment, the local SCI partitioning register 238 includes a 32-bit register, sixteen of which are shown. A number of the unshown bits are used for other enabling functions that are not pertinent to the present invention. Column 1 300 of the table identifies bits 0–15 of the local SCI partitioning register 238. The second column 302 describes the signal stored at the corresponding bit location. For example, bit 0 of the local SCI partitioning register 238 stores a signal IP-0 which indicates that the instruction processor-0 is available to be attached to a partition. If bit 0 of-the local SCI partitioning register 238 is set, the instruction processor-0 is available to be attached to a requesting partition. Bit 1 of local SCI partitioning register 238 stores a signal IP-0 EN, which indicates that the instruction processor-0 is enabled. The IP-0 enable signal indicates that the SC wants instruction processor-0 to be attached to the local storage controller. In the preferred embodiment, both the IPO AVAIL and the IP-0 EN signals must be set before the instruction processor-0 will be attached to the local storage controller. Bits 2–7 of the local SCI partitioning register 238 have similar descriptions, but correspond to other instruction processors associated with the local storage controller.

Bit 8 of the local SCI partitioning register 238 stores a SC available signal which indicates that the local storage controller is available to be attached to the remote partition. Bit 9 of the local SCI partitioning register 238 stores a remote SC enable signal, which indicates that the local storage controller wants the remote storage controller to be attached to the local partition. Bits 10–12 of the local SCI partitioning register 238 indicate whether a number of main storage units should be attached to the local partition. Bits 13–15 of the local SCI partitioning register 238 are unused in the preferred embodiment.

FIG. 7 is a table showing the SA ASIC partitioning register and the bit descriptions therefore. In the preferred embodiment, the SA ASIC partitioning register 242 is located in the SA ASIC 176 and includes a 16-bit register. Each of the 16 bits is listed in the first column 312 of table 310. The second column 314 describes the signal stored at the corresponding bit location. The remaining columns describe the logical definition for each of the signals in the second column 314. For example, bit 4 of the SA ASIC partitioning register 242 stores a signal remote IP-0 partition. This signal is generated by ANDING the local remote SC enable signal and the remote IP-0 enable signal, as shown at 316. The prefix "LOC" indicates that the signal was generated by the local partition. The prefix "REM" indicates that the signal was generated by the remote partition, and serially transmitted to the local partition. The prefix "LOC REM" indicates that the signal was generated by the local partition to enable the remote SC.

Figure 8:
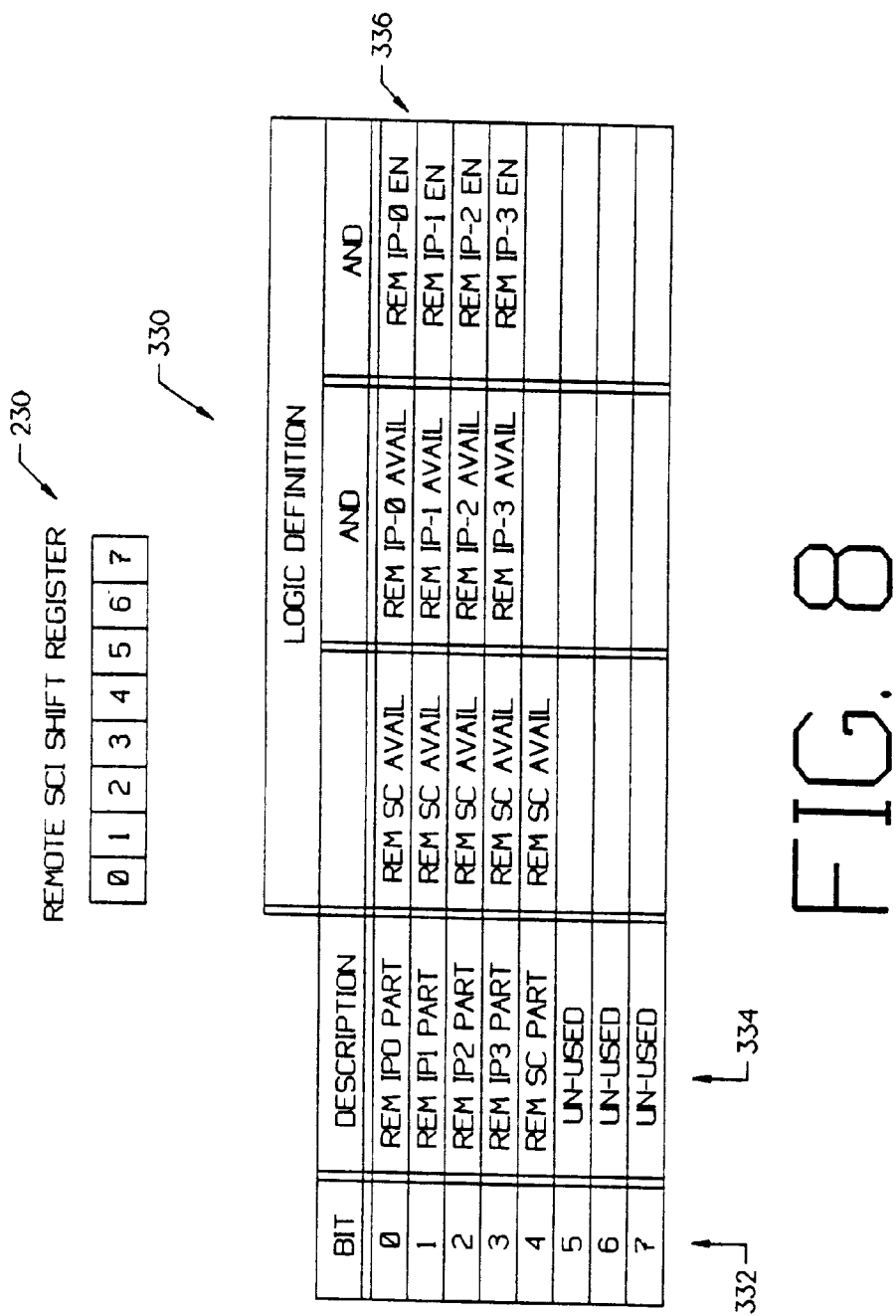
FIG. 8 is a table showing the remote SCI shift register, and the bit descriptions therefor.

FIG. 8 is a table showing the remote SCI shift register and the bit descriptions therefore. The remote SCI shift register receives the remote partitioning bits from the remote partition. In a preferred embodiment, the remote SCI shift register 230 is an 8-bit register. Each of the 8 bits is shown in the first column 332 of table 330. The description of the signal stored at each bit location is shown in the second column 334 of table 330. The remaining columns indicate the logical definition for each of the signals in the second column 334 of the table 330. For example, bit 1 of the remote SCI shift register 230 stores a signal named remote IP-1 part. The remote IP-1 part signal is generated by logically ANDING the remote SC available signal, the remote IP-1 available signal, and the remote IP-1 enable signal, as shown at 336. In a preferred embodiment, the logic to produce the signals is provided in the SCI to SCI shift logic block of the remote partition (see FIG. 5), and is shown in FIG. 9.

Figure 9:
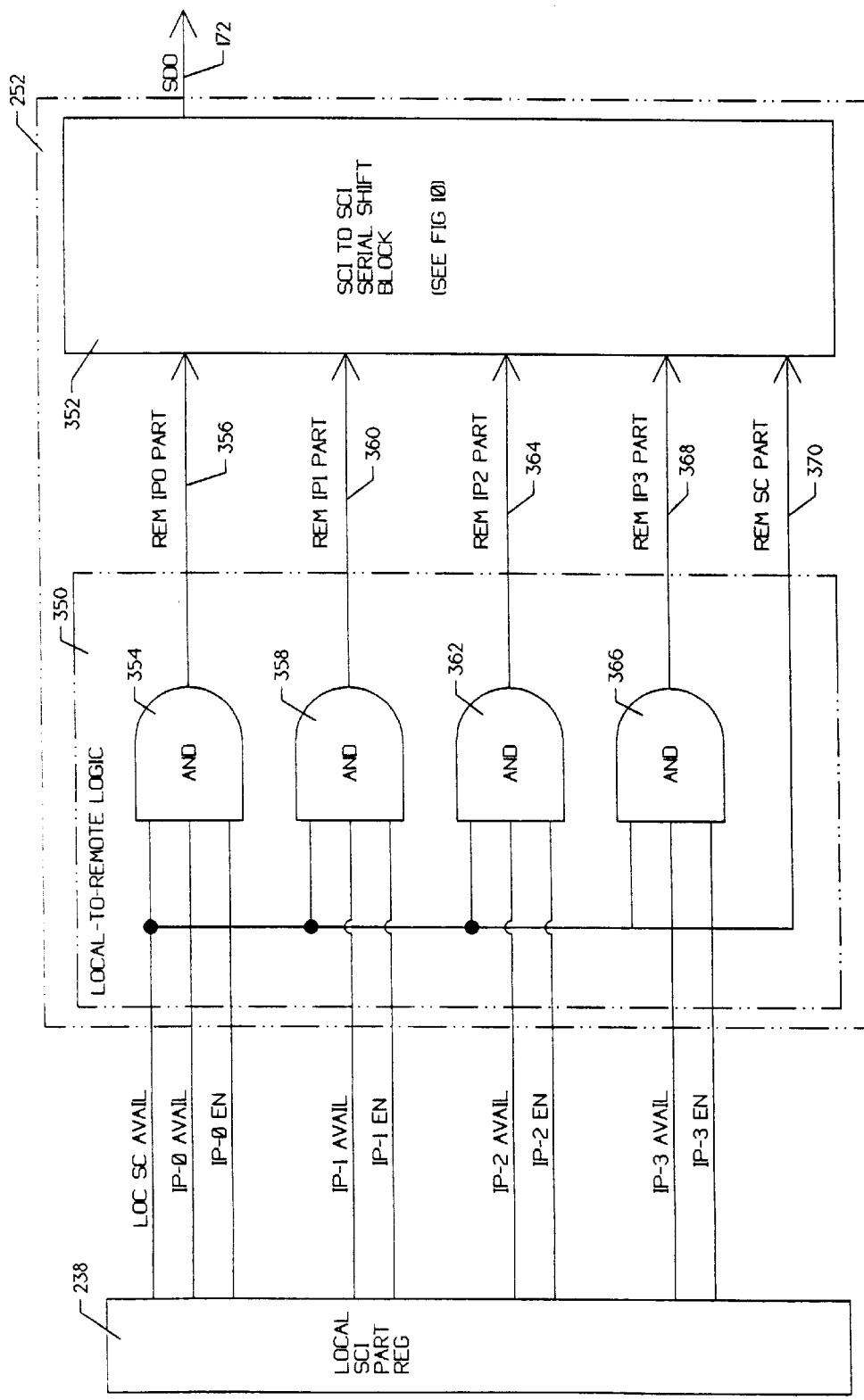
FIG. 9 is a schematic diagram showing an exemplary implementation of a local-to-remote logical combining block within the SCI-to-SCI shift logic block of FIG. 5.

FIG. 9 is a schematic diagram showing an exemplary implementation of a local to remote logical combining block within the SCI to SCI shift logic block of FIG. 5. The SCI to SCI shift logic block 252 logically combines selected local partitioning bits and provides the result to the remote partition. The local SCI partitioning register 238 is shown, wherein selected signals are provided to the local-to-remote logic block 350. The local-to-remote logic block 350 implements the same logic that is defined in the logic definition columns of the table 330 shown in FIG. 8. However, the local-to-remote logic block 350 is located in the local partition, and therefore, combines local partitioning bits, rather than remote partition bits as shown in FIG. 8. The outputs of the local-to-remote logic block 350 are provided to an SCI to SCI serial shift block 352. The local-to-remote logic block 350 provides a remote IP-0 Part signal 356, a remote IP-1 Part signal 360, a remote IP-2 Part signal 364, a remote IP-3 Part signal, and a remote SC Part signal 370 to the SCI to SCI serial shift block 352. The SCI to SCI serial shift block 352 serially transmits these signals to the storage controller interface block located in the remote partition. A preferred implementation of the SCI to SCI serial shift block 4s shown and described with reference to FIG. 10.

Figure 10:
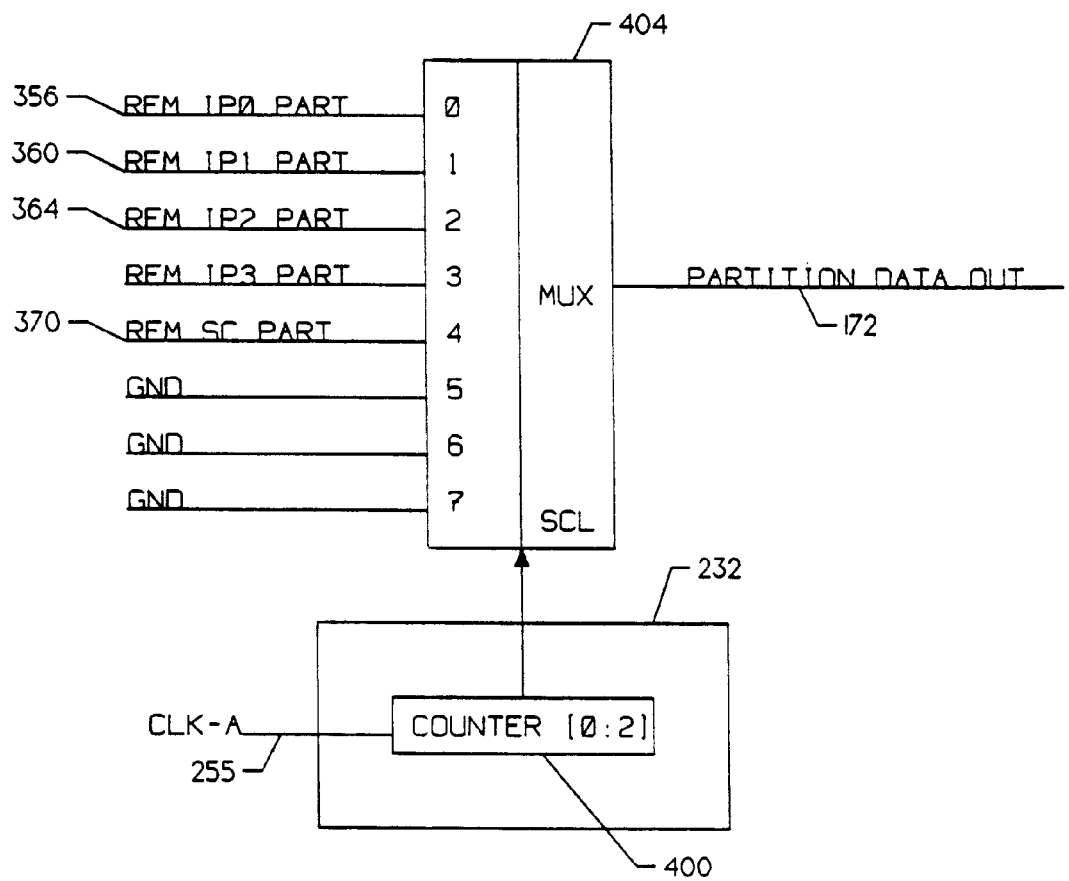
FIG. 10 is a schematic diagram showing an exemplary implementation for the SCI-to-SCI Serial shift logic block of FIG. 9.

FIG. 10 is a schematic diagram showing the exemplary implementation for the SCI to SCI serial shift logic block of FIG. 9. In a preferred embodiment, the signals provided by the local-to-remote logic block 350 (see FIG. 9) are provided to a multiplexer 404, as shown. For example, the remote IP-0 part signal 356 is provided to a first input of multiplexer 404, and the remote IP-1 part signal 360 is provided to a second input of multiplexer 404, as shown.

The SCI synch counter remote-in block 232 may provide the select signals to multiplexer 404. The SCI synch counter remote-in block 232 may include a counter 400, wherein the counter is clocked by a first clock signal 255. In the preferred embodiment, counter 400 is a 3-bit counter. The output of the counter is provided to the select inputs of multiplexer 404.

When the first clock signal 255 is clocked, the counter 400 increments causing the multiplexer 404 to select a first one of the inputs of the multiplexer 404. During the next clock cycle of the first clock signal 255, the counter again increments, causing the multiplexer to select a second one of the inputs of the multiplexer 404. Thus, assuming the counter 400 has an initial value of 000, the first input of multiplexer 404 would be selected, thereby causing the remote IP-0 part signal 356 to be provided to a serial partition data out interface 172. During the next clock cycle of the first clock 255, counter 400 may increment to a value of 001, causing the remote IP-1 part signal 360 to be provided to the serial partition data out interface 172.

As shown in FIG. 8, bits 5–7 of the remote SCI shift register 230 (see FIG. 5) are unused in the preferred embodiment. Thus, the last three inputs of multiplexer 404 are not used and, in the preferred embodiment, are tied to ground as shown.

Figure 11:
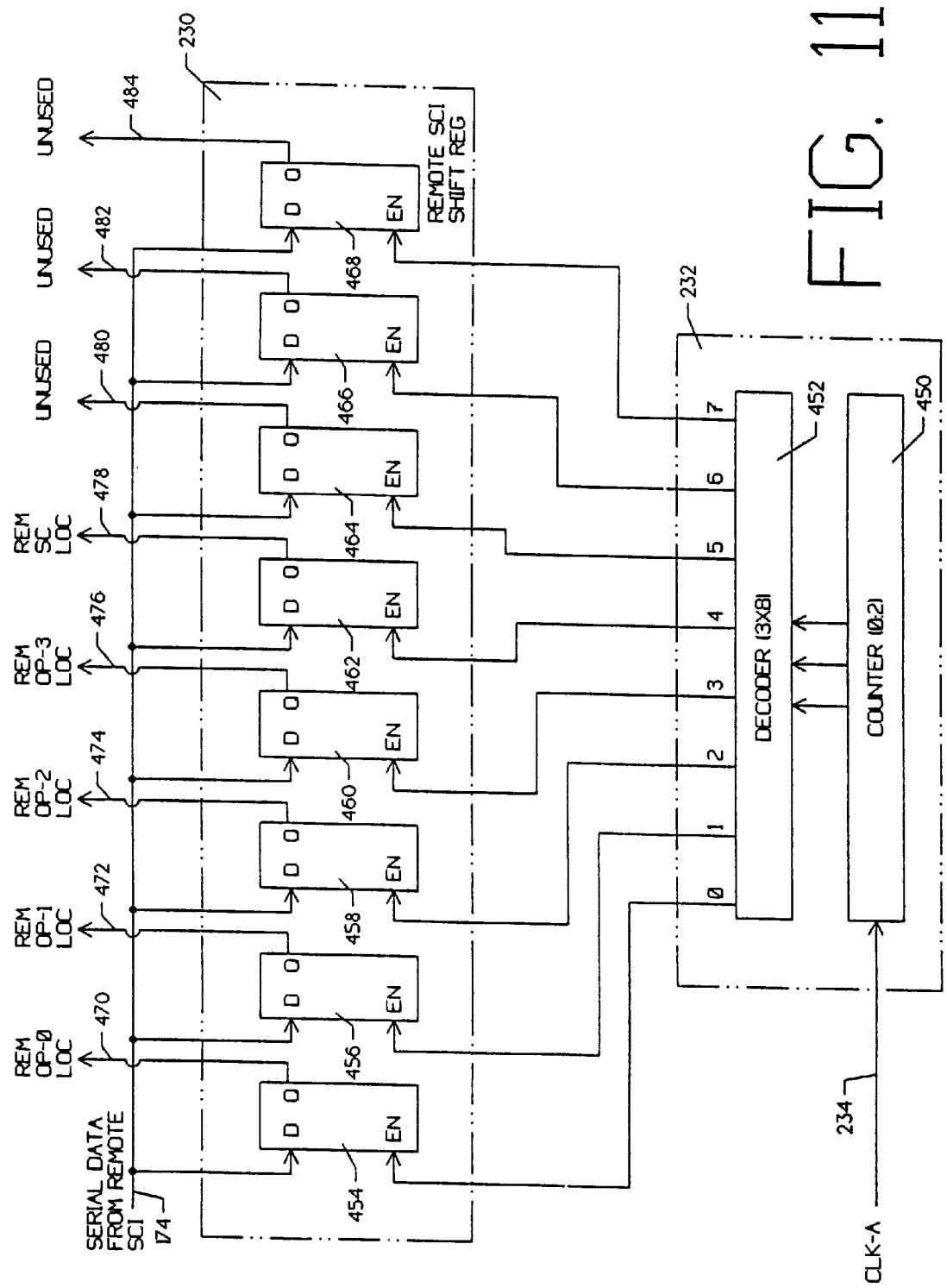
FIG. 11 is a schematic diagram showing an exemplary implementation for the Remote SCI shift Register block of FIG. 5.

FIG. 11 is a schematic diagram showing a preferred implementation of the remote SCI shift register block of FIG. 5. The remote SCI shift register 230 receives a serial stream of data from and SCI to SCI shift logic block contained in the remote partition (similar to the SCI to SCI shift logic block 252 discussed with reference to FIGS. 9 and 10). The serial stream of data is received via interface 174, and is provided to the data input of each bit of the remote SCI shift register 230 as shown. The SCI synch counter remote-in block 232 (see FIG. 5) may include a counter and decoder similar to that of SCI synch counter remote-out block 254 discussed with reference to FIG. 10. The outputs of the decoder 452 may be coupled to the enable signals of each of the latches in the remote SCI shift register 230 as shown. During each cycle of the first clock 234, a different one of the latches of the remote SCI shift register 230 is enabled. For example, assuming the counter 450 has an initial state of 000, the decoder 452 enables the first latch 454 of remote SCI shift register 230. During the next clock cycle of the first clock 234, the counter may increment to a value of 001, wherein the decoder 452 will disable the first latch 454 and enable the second latch 456. At the same time, the SCI to SCI shift logic block of the remote partition will provide the remote IP-1 data signal on the serial data interface 174. Thus, the SCI synch counter remote-in block 232 (see FIG. 5) and the SCI synch counter remote-in block of the remote partition may synchronize the serial transmission of the data between the SCI to SCI shift logic block of the remote partition and the remote SCI shift register 230 of the local partition.

Figure 12:
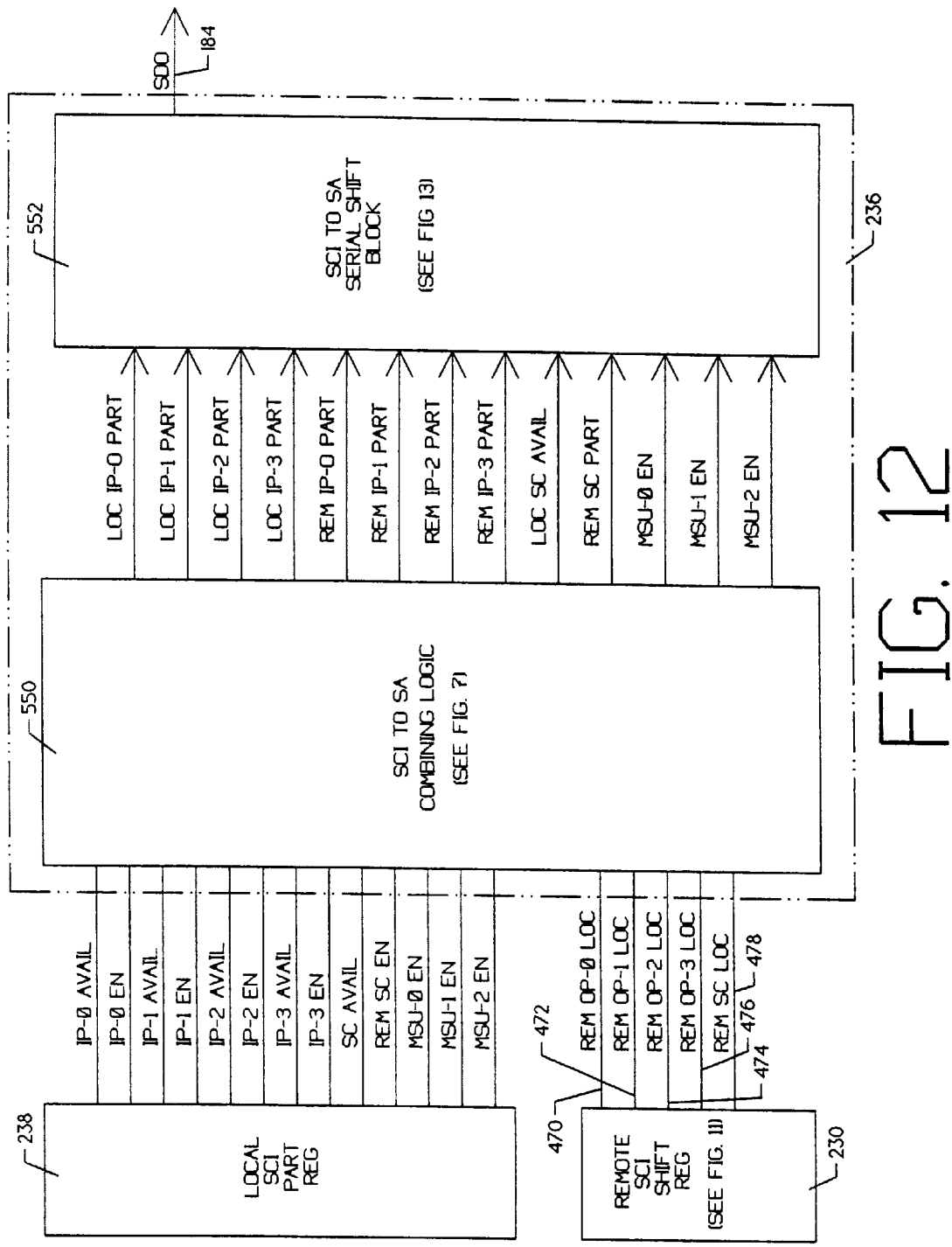
FIG. 12 is a schematic diagram showing an exemplary implementation of the SCI-to-SA ASIC shift logic block of FIG. 5.

FIG. 12 is a schematic diagram showing the preferred implementation of the SCI-to-SA ASIC shift logic block of FIG. 5. In the preferred embodiment, partitioning information is continuously and serially transmitted from the I/O ASIC 168 to the SA ASIC 176 via a serial interface 184 (see FIG. 5). Further, the SCI to SA ASIC shift logic block 236 includes a logical combining function to combine selected local partitioning bits with selected signals from the remote SCI shift register 230. The logical combining function is contained in SCI to SA combining logic 550, and is described with reference to FIG. 7. The output of SCI to SA combining logic 550 is provided to an SCI to SA serial shift block 552. The SCI to SA serial shift block 552 serially transmits the signals provided by the SCI to SA combining logic block 550 to the SA ASIC partitioning shift register 242 via the serial interface 184 (see FIG. 5). The SCI to SA combining logic block 550 and the SCI to SA serial shift block 552 are both located within the SCI to SA ASIC shift logic block 236 of FIG. 5.

Figure 13:
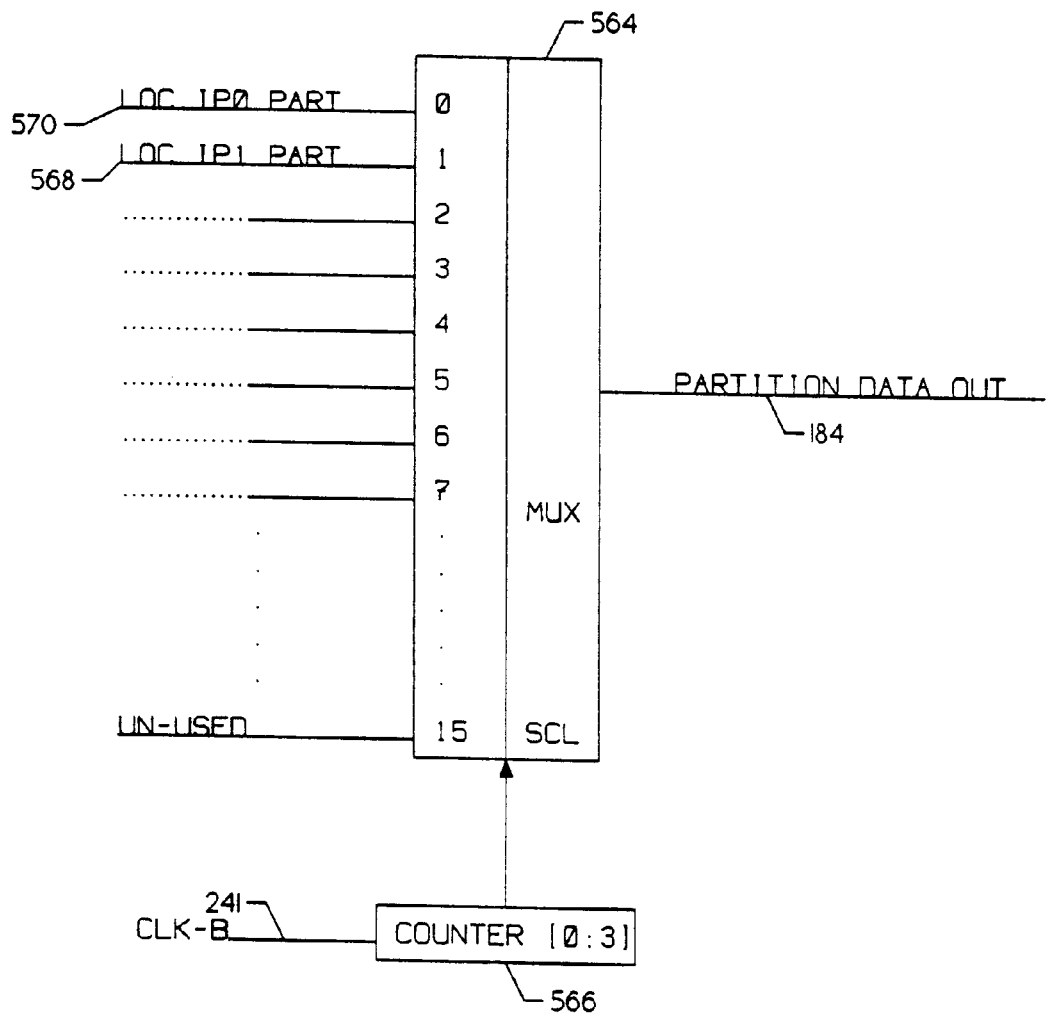
FIG. 13 is a schematic diagram showing an exemplary implementation of the SCI-to-SA Serial Shift Block of FIG. 12.

FIG. 13 is a schematic diagram showing an exemplary implementation for the SCI-to-SA serial shift block of FIG. 12. The operation of the SCI-to-SA serial shift block is similar to the SCI to SCI serial shift block shown and described with reference to FIG. 10. That is, the signals provided by the SCI-to-SA combining logic 550 (see FIG. 12) are provided to a multiplexer 564, as shown. For example, the loc IP-0 part signal 570 is provided to a first input of multiplexer 564, and the loc IP-1 part signal 568 is provided to a second input of multiplexer 564, as shown.

A counter 566 is provided, wherein the counter is clocked by a second clock signal 241. In the preferred embodiment, counter 566.is a 4-bit counter. The output of the counter is provided to the select inputs of multiplexer 564.

When the second clock signal 241 is clocked, the counter 566 increments causing the multiplexer 564 to select a first one of the inputs of the multiplexer 564. During the next clock cycle of the second clock signal 241, the counter again increments, causing the multiplexer 564 to select a second one of the inputs of the multiplexer 564. Thus, assuming the counter 566 has an initial value of 000, the first input of multiplexer 564 would be selected, thereby causing the loc IP-0 part signal 570 to be provided to a serial partition data out interface 184 (see FIG. 5). During the next clock cycle of the second clock 241, counter 566 may increment to a value of 001, causing the loc IP-1 part signal 568 to be provided to the serial partition data out interface 184.

As shown in FIG. 12, bits 13–15 of the SA ASIC partitioning register are unused in the preferred embodiment. Thus, the last three inputs of multiplexer 564 are un-used and, in the preferred embodiment, are tied to ground.

Figure 14:
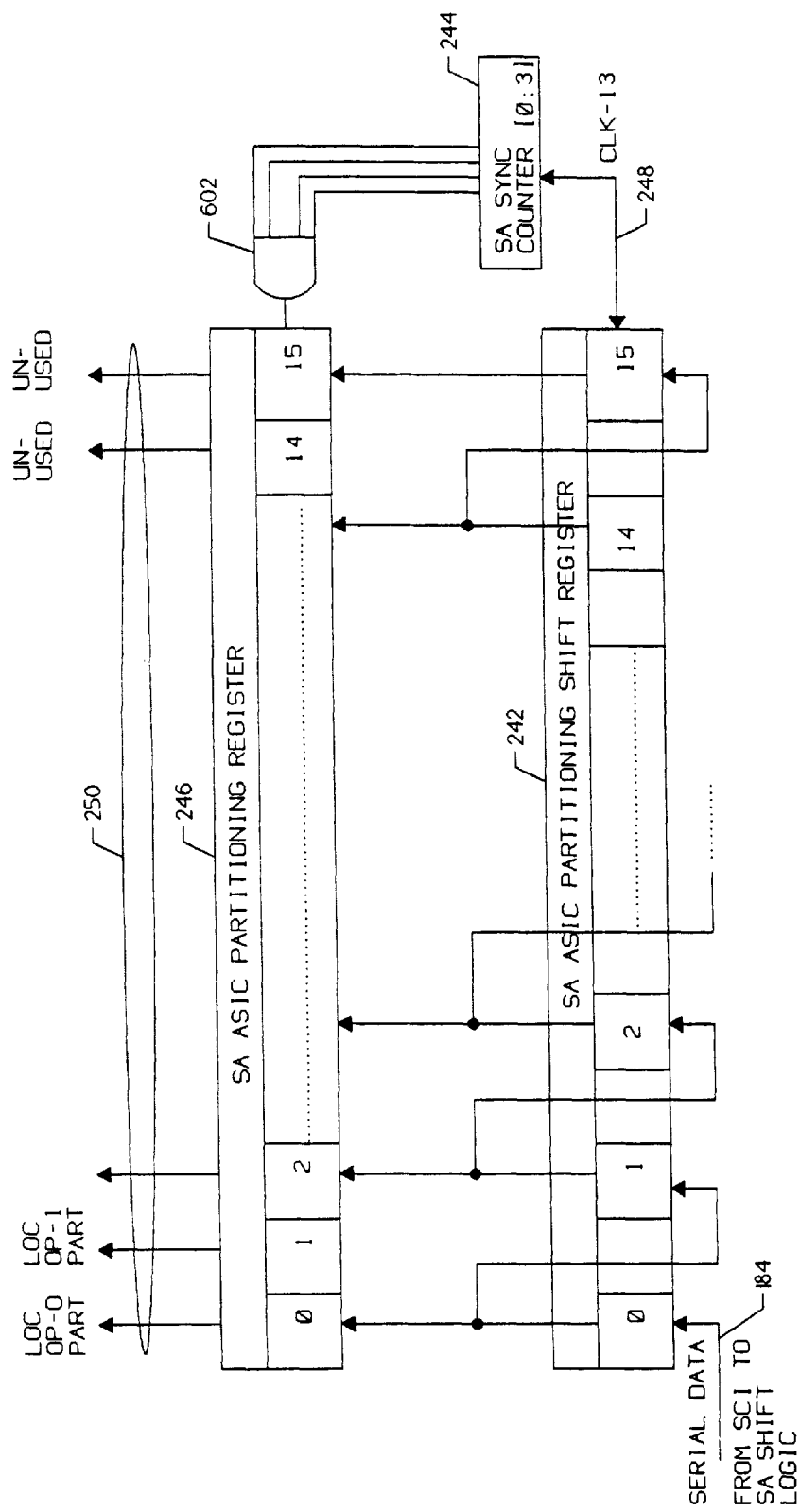
FIG. 14 is a schematic diagram showing an exemplary implementation of the SA ASIC Partition Shift Register block of FIG. 5.

FIG. 14 is a schematic diagram showing an exemplary implementation of the SA ASIC partitioning shift register block, the SA ASIC partitioning register 246 and the SA sync counter of FIG. 5. The synchronization of the serial data transfer is similar to the remote SCI shift register block shown and described with reference to FIG. 11.

The SA ASIC Partitioning Shift register 242 receives a serial stream of data from and SCI to SA shift logic block 236 (see FIG. 5). The serial stream of data is received via interface 184, and is provided to the data input of the SA ASIC partitioning shift register 242. In a preferred embodiment, the SA ASIC partitioning shift register 242 is a sixteen bit shift register. The parallel outputs of the SA ASIC partitioning shift register 242 are provided to the SA ASIC partitioning shift register 246.

The SA ASIC partitioning shift register 242 is directly clocked by the second clock 248, as shown. Thus, SA ASIC partitioning shift register 242 receives and shifts in a full group of 16 partition bits every sixteen clock cycles of the second clock 248.

The second clock 248 also clocks the SA SYNC counter 244, as shown. In a preferred embodiment, the SA SYNC counter 244 is a four bit counter, and is coupled to a four bit AND gate 602. The SA ASIC partitioning register 246 is clocked, or enabled, by the output of AND gate 602. In this configuration, the contents of the SA ASIC partitioning shift register 242 are uploaded to the SA ASIC partitioning register 246 after a group of sixteen partition bits have been shifted into the SA ASIC partitioning shift register 242, as described above. In this way, the serial transmission of the data between the SCI to SA shift logic block 236 and the SA ASIC 176 may be synchronized.

Figure 15:
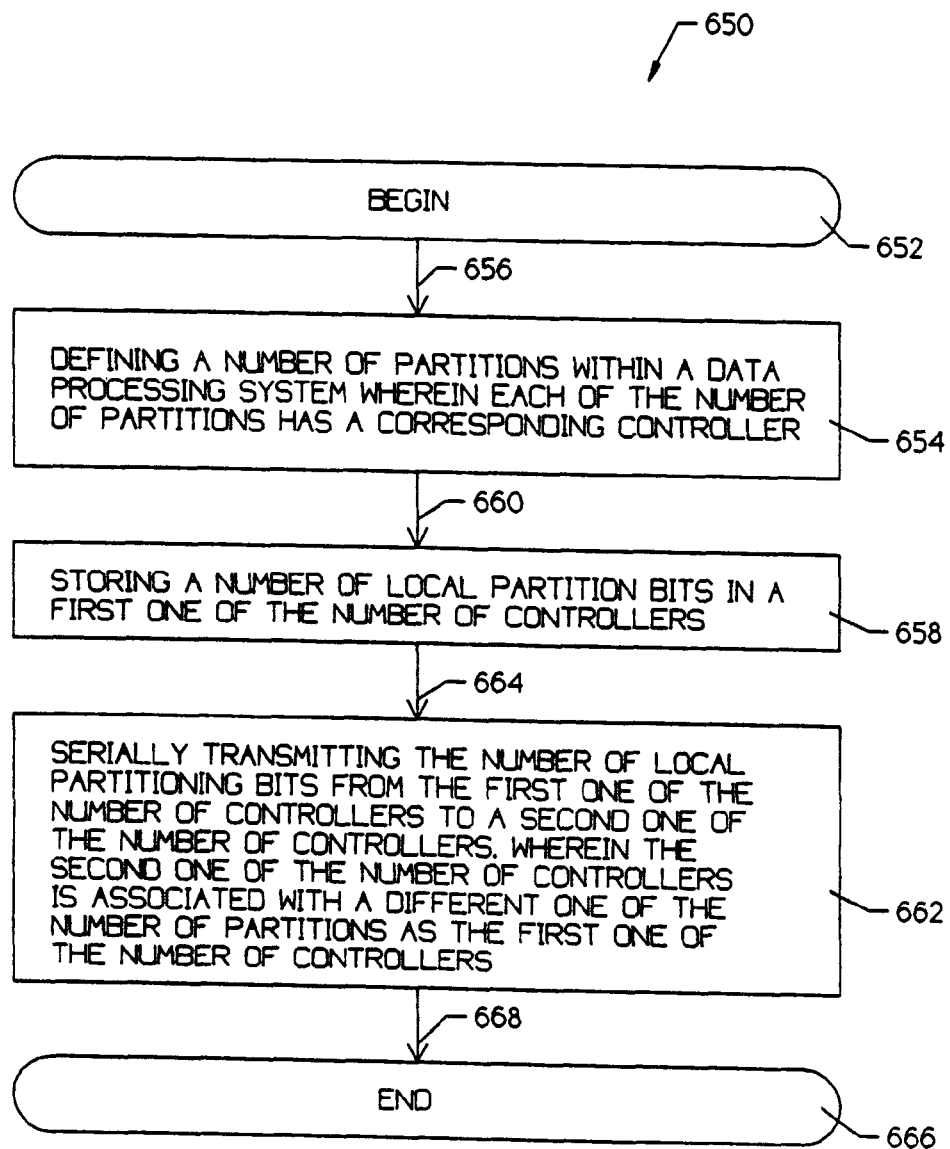
FIG. 15 is a flow diagram showing a first exemplary method of the present invention.

FIG. 15 is a flow diagram showing a first exemplary method of the present invention. The flow diagram is generally shown at 650. The algorithm is entered at element 652, wherein control is passed to element 654 via interface 656. Element 654 defines a number of partitions within a data processing system, wherein each of the number of partitions has a corresponding controller. Control is then passed to element 658 via interface 660. Element 658 stores a number of local partition bits in a first one of the number of controllers. Control is then passed to element 662 via interface 664. Element 662 serially transmits the number of local partitioning bits from the first one of the number of controllers to a second one of the number of controllers, wherein the second one of the number of controllers is associated with a different one of the number of partitions as the first one of the number of controllers. Control is then passed to element 666 via interface 668, wherein the algorithm is exited.

Figure 16:
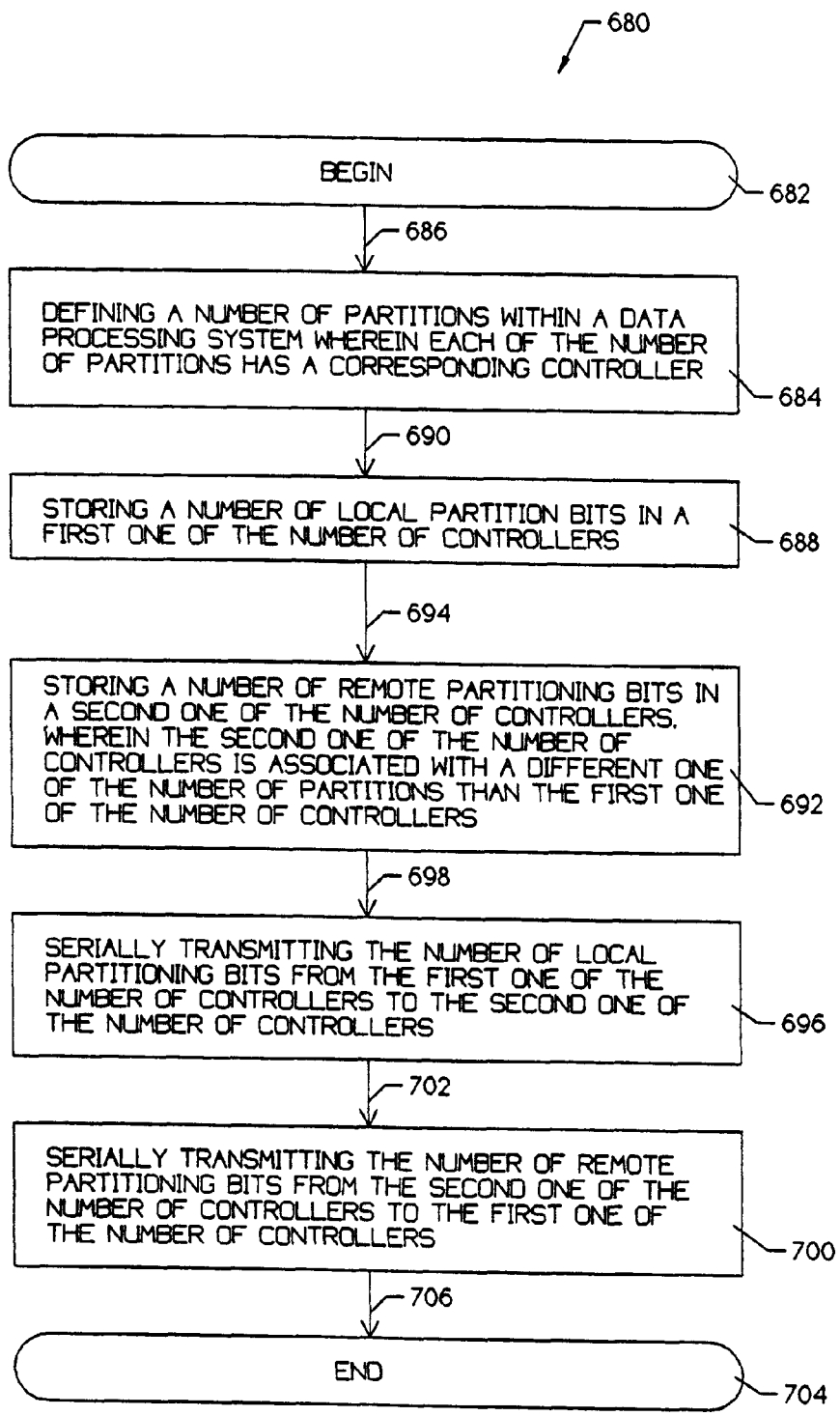
FIG. 16 is a flow diagram showing a second exemplary method of the present invention.

FIG. 16 is a flow diagram showing a second exemplary method of the present invention. The flow diagram is generally shown at 680. The algorithm is entered at element 682, wherein control is sassed to element 684 via interface 686. Element 684 defines a number of partitions within the data processing system, wherein each of the number of partitions has a corresponding controller. Control is then passed to element 688 via interface 690. Element 688 stores a number of local partitioning bits in a first one of the number of controllers. Control is then passed to element 692 via interface 694. Element 692 stores a number of remote partitioning bits in a second one of the number of controllers, wherein the second one of the number of controllers is associated with a different one of the number of partitions than the first one of the number of controllers. Control is then passed to element 696 via interface 698. Element 696 serially transmits the number of local partitioning bits from the first one of the number of controllers to the second one of the number of controllers. Control is then passed to element 700 via interface 702. Element 700 serially transmits the number of remote partitioning bits from the second one of the number of controllers to the first one of the number of controllers. Control is then passed to element 704 via interface 706, wherein the algorithm is exited. It is contemplated that element 696 and element 700 may serially transmit their respective partitioning bits continuously and simultaneously.

Figure 17:
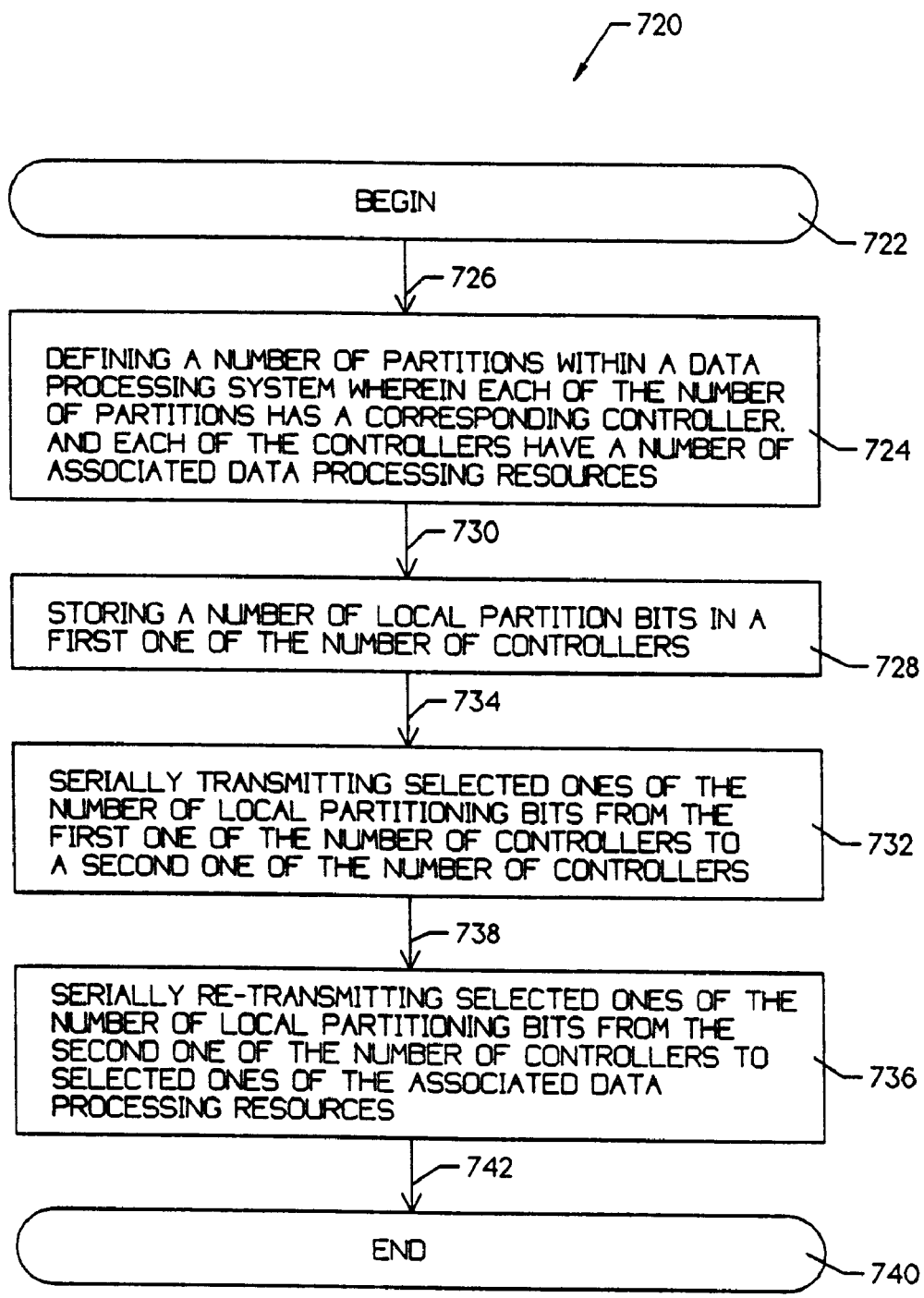
FIG. 17 is a flow diagram showing a third exemplary method of the present invention.

FIG. 17 is a flow diagram showing a third exemplary method of the present invention. The flow diagram is generally shown at 720. The algorithm is entered at element 722, wherein control is passed to element 724 via interface 726. Element 724 defines a number of partitions within a data processing system, wherein each of the number of partitions has a corresponding controller, and each of the controllers have a number of associated data processing resources. Control is then passed to element 728 via interface 730. Element 728 stores a number of local partitioning bits in a first one of the number of controllers. Control is then passed to element 732 via interface 734. Element 732 serially transmits selected ones of the number of local partitioning bits from the first one of the number of controllers to a second one of the number of controllers. Control is then passed to element 736 via interface 738. Element 736 serially re-transmits selected ones of the number of local partitioning bits from the second one of the number of controllers to selected ones of the associated data processing resources. Control is then passed to element 740 via interface 742, wherein the algorithm is exited.

Figure 18:
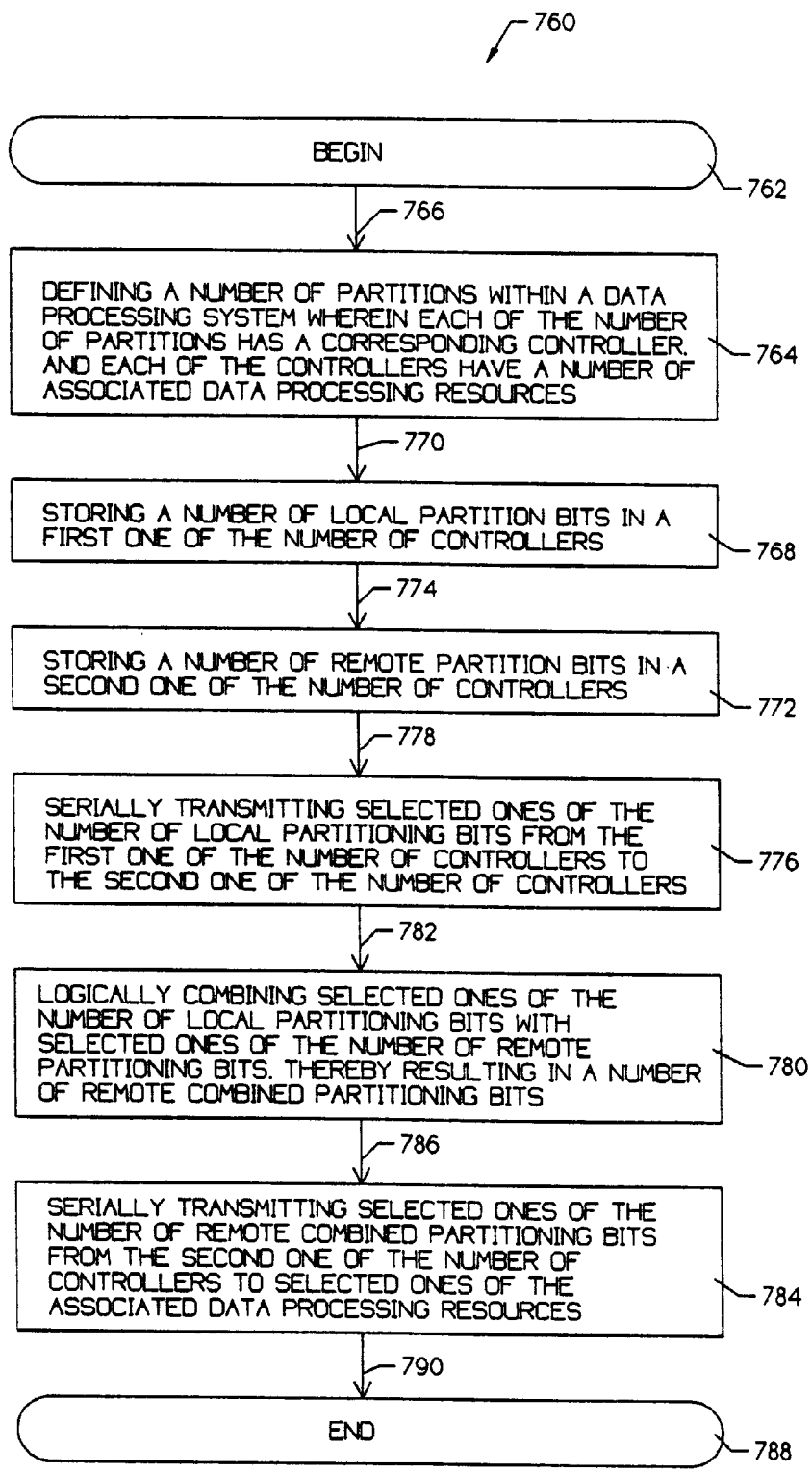
FIG. 18 is a flow diagram showing a fourth exemplary method of the present invention.

FIG. 18 is a flow diagram showing a fourth exemplary method of the present invention. The flow diagram is generally shown at 760. The algorithm is entered at element 762, wherein control is passed to element 764 via interface 766. Element 764 defines a number of partitions within the data processing system, wherein each of the number of partitions has a corresponding controller, and each of the controllers have a number of associated data processing resources. Control is then passed to element 768 via interface 770. Element 768 stores a number of local partitioning bits in a first one of the number of controllers. Control is then passed to element 772 via interface 774. Element 772 stores a number of remote partitioning bits in a second one of the number of controllers. Control is then passed to element 776 via interface 778. Element 776 serially transmits selected ones of the number of local partitioning bits from the first one of the number of controllers to the second one of the number of controllers. Control is then passed to element 780 via interface 782. Element 780 logically combines selected ones of the number of local partitioning bits with selected ones of the number of remote partitioning bits, thereby resulting in a number of remote combined partitioning bits. Control is then passed to element 784 via interface 786. Element 784 serially transmits selected ones of the number of remote combined partitioning bits from the second one of the number of controllers to selected ones of the associated data processing resources. Control is then passed to element 788 via interface 790, wherein the algorithm is exited.

Figure 19:
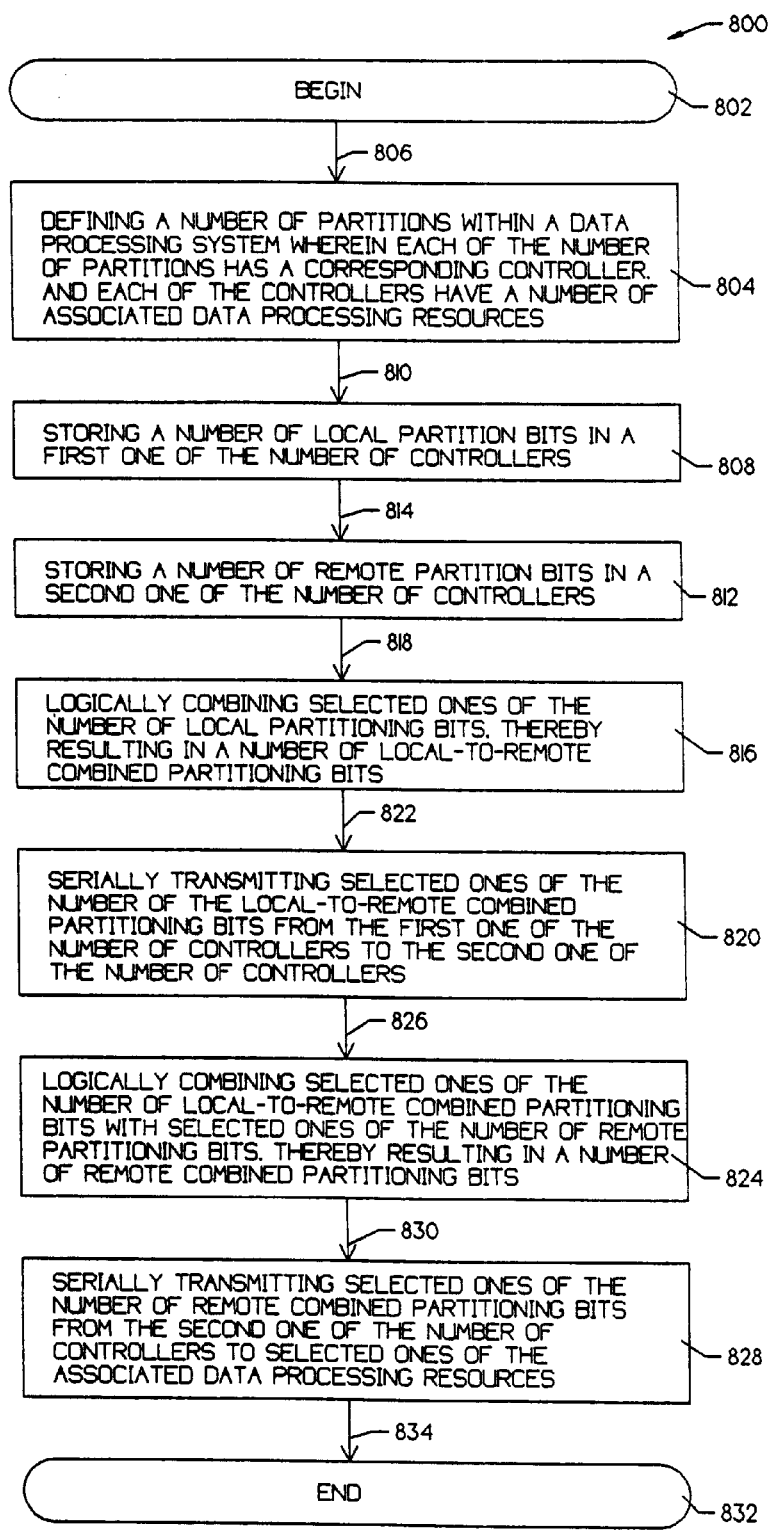
FIG. 19 is a flow diagram showing a fifth exemplary method of the present invention.

FIG. 19 is a flow diagram showing a fifth exemplary method of the present invention. The flow diagram is generally shown at 800. The algorithm is entered at element 802, wherein control is passed to element 804 via interface 806. Element 804 defines a number of partitions within the data processing system, wherein each of the number of partitions has a corresponding controller, and each of the controllers has a number of associated data processing resources. Control is then passed to element 808 via interface 810. Element 808 stores a number of local partitioning bits in a first one of the number of controllers. Control is then passed to element 812 via interface 814. Element 812 stores a number of remote partitioning bits in a second one of the number of controllers. Control is then passed to element 816 via interface 818. Element 816 logically combines selected ones of the number of local partitioning bits, thereby resulting in a number of local-to-remote combined partitioning bits. Control is then passed to element 820 via interface 822. Element 820 serially transmits selected ones of the number of local-to-remote combined partitioning bits from the first one of the number of controllers to the second one of the number of controllers. Control is then passed to element 824 via interface 826. Element 824 logically combines selected ones of the number of local-to-remote combined partitioning bits with selected ones of the number of remote partitioning bits, thereby resulting in a number of remote combined partitioning bits. Control is then passed to element 828 via interface 830. Element 828 serially transmits selected ones of the number of remote combined partitioning bits from the second one of the number of controllers to selected ones of the associated data processing resources. Control is then passed to element 832 via interface 834, wherein the algorithm is exited.

Having thus described the preferred embodiments of the present invention, those of skill in the art will readily appreciate that the teachings found herein may be applied to yet other embodiments within the scope of the claims hereto attached.

We claim:

1. In a multi-processor data processing system having a number of data Processing resources including a plurality of instruction processors, wherein the number of data processing resources are partitioned into a number of data processing partitions wherein each partition operates independently of other partitions, the data processing system including a number of controllers wherein selected ones of the number of controllers correspond to selected ones of the number of data processing partitions, the improvement comprising:

a. a first serial interface coupling a first one of the number of controllers and a second one of the number of controllers, said first one of the number of controllers determining if a particular data processing resource may be added to the corresponding partition by reading a number of first partitioning bits from said second one of the number of controllers wherein the number of first partitioning bits are serially transmitted from the second controller to the first controller via said first serial interface;

b. wherein the first controller comprises an input/output block and a number of controller units, and the second controller comprises an input/output block and a number of controller units;

c. wherein said first serial interface couples said input/output blocks of the first and second controllers, wherein the number of first partitioning bits are serially transmitted from the input/output block of the second controller to said input/output block of the first controller via said first serial interface; and d. a third serial interface extending between said input/output block of the first controller and a selected one of the number controller units of the first controller.

2. A data processing system according to claim 1 wherein selected ones of the number of first partitioning bits are serially transmitted from the input/output block of the first controller to the controller unit of the selected one of the number of data processing resources associated with the first controller via said third serial interface.

3. A data processing system according to claim 1 wherein the number of first partitioning bits are logically combined with a number of local partitioning bits stored in the first controller thereby resulting in a number of local combined partitioning bits, the number of local combined partitioning bits being serially transmitted from the input/output block of the first controller to the controller unit of the selected one of the number of data processing resources associated with the first controller via said third serial interface.

4. A data processing system according to claim 3 wherein the number of local combined partitioning bits are continuously transmitted from the input/output block of the first controller to the controller unit of the selected one of the number of data processing resources associated with the first controller via said third serial interface.

5. A data processing system according to claim 4 wherein said number of local combined partitioning bits identify selected ones of the number of data processing resources that are available to the corresponding partition.

6. A data processing system according to claim 4 wherein the first controller comprises a first sync counter and the second controller comprises a second sync counter, wherein the first sync counter and the second sync counter control the serial transmission of the number of first partitioning bits over the first serial interface.

7. A data processing system according to claim 6 wherein the input/output block of the first controller includes a third sync counter and the controller unit of the selected one of the data processing resources associated with the first controller includes a fourth sync counter, wherein the third sync counter and the fourth sync counter control the serial transmission of the number of local combined partition bits over said third serial interface.

8. An apparatus to serially transfer partitioning information in a multi-processor data processing system having a plurality of instructions processors, wherein the data processing system includes a local system control interface block, a number of local data processing resources controlled by said local system control interface block, a remote system control interface block and a number of remote data processing resources controlled by said remote system control interface block, the local system control interface providing a number of local partitioning bits defining said number of local data processing resources and the remote system control interface providing a number of remote partitioning bits defining said number of remote data processing resources, the apparatus comprising:

a. a number of local serial interfaces coupling the local system control interface block to the number of local data processing resources for serially transmitting selected ones of the number of local partitioning bits from the local system control interface block to the number of local data processing resources;

b. a number of remote serial interfaces coupling the remote system control interface block to the number of remote data processing resources for serially transmitting selected ones of the number of remote partitioning bits from the remote system control interface block to the number of remote data processing resources;

c. a first serial interface coupling the local system control interface block to the remote system control interface block for serially transmitting selected ones of the number of local partitioning bits from the local system control interface block to the remote system control interface block;

d. a second serial interface coupling the remote system control interface block to the local system control interface block from serially transmitting selected ones of the number of remote partitioning bits from the remote system control interface block to the local system control interface block; and e. wherein the local system control interface block includes a first local sync counter and the remote system control interface block includes a first remote sync counter, wherein the first local sync counter and the first remote sync counter control the serial transmission of the selected local partitioning bits from the local system control interface block to the remote system control interface block via the first serial interface.

9. An apparatus according to claim 8 wherein the local system control interface block includes a second local sync counter and the remote system control interface block includes a second remote sync counter, wherein the second local sync counter and the second remote sync counter control the serial transmission of the selected remote partitioning bits from the remote system control interface block to the local system control interface block via the second serial interface.

10. An apparatus according to claim 8 wherein the local system control interface block includes a third local sync counter and a first one of the number of local data processing resources includes a first resource sync counter, wherein the third local sync counter and the first resource sync counter control the serial transmission of the selected local partitioning bits from the local system control interface block to said first one of the number of local data processing resources.

11. An apparatus to serially transfer partitioning information in a multi-processor data processing system having a plurality of instruction processors, wherein the data processing system includes a local system control interface block, a number of local data processing resources controlled by said local system control interface block, a remote system control interface block and a number of remote data processing resources controlled by said remote system control interface block, the local system control interface storing a number of local partitioning bits defining said number of local data processing resources and the remote system control interface storing a number of remote partitioning bits defining said number of remote data processing resources, the apparatus comprising:
   a. a first local combing block for logically combining selected ones of the local partitioning bits, thereby resulting in a number of local-to-remote combined partitioning bits; and
   b. a first serial interface coupling the local system control interface block to the remote system control interface block for serially transmitting selected ones of the number of local-to-remote partitioning bits from the local system control interface block to the remote system control interface block.

12. An apparatus according to claim 11 further comprising:
   a. a first remote combining block for logically combining selected ones of the local-to-remote combined partitioning bits, received via the first serial interface, with selected ones of the number of remote partitioning bits, thereby resulting in a number of remote combined partitioning bits; and
   b. a number of remote serial interfaces coupling the remote system control interface block to the number of remote data processing resources for serially transmitting selected ones of the number of remote combined partitioning bits from the first remote combining block to the number of remote data processing resources.

13. An apparatus according to claim 12 further comprising:
   a. a second remote combining block for logically combining selected ones of the number of remote partitioning bits, thereby resulting in a number of remote-to-local combined partitioning bits; and
   b. a second serial interface coupling the remote system control interface block to the local system control interface block for serially transmitting selected ones of the number of remote-to-local partitioning bits from the remote system control interface block to the local system control interface block.

14. An apparatus according to claim 13 further comprising:
   a. a second local combining block for logically combining selected ones of the remote-to-local partitioning bits, received via the second serial interface, with selected ones of the number of local partitioning bits, thereby resulting in a number of local combined partitioning bits; and
   b. a number of local serial interfaces coupling the local system control interface block to the number of local data processing resources for serially transmitting selected ones of the number of local combined partitioning bits from the second local combining block to the number of local data processing resources.

15. A method for transmitting partitioning information between a number of partitions in a data processing system, wherein each of the number of partitions have a corresponding controller, and each of the controllers have a number of associated data processing resources, the method comprising the steps of:
   a. storing a number of local partition bits in a first one of the number of controllers;
   b. storing a number of remote partition bits in a second one of the number of controllers, wherein the second one of the number of controllers is associated with a different one of the number of partitions as the first one of the number of controllers;
   c. serially transmitting selected ones of the number of local partitioning bits from the first one of the number of controllers to the second one of the number of controllers;
   d. logically combining selected ones of the number of local partitioning bits, received by the second one of the number of controllers in step (c), and selected ones of the number of remote partitioning bits, thereby resulting in a number of remote combined partitioning bits; and
   e. serially transmitting selected ones of the number of remote combined partitioning bits from the second one of the number of controllers to selected ones of the associated data processing resources.

16. A method for transmitting partitioning information between a number of partitions in a data processing system, wherein each of the number of partitions have a corresponding controller, and each of the controllers have a number of associated data processing resources, the method comprising the steps of:
   a. storing a number of local partition bits in a first one of the number of controllers;
   b. storing a number of remote partition bits in a second one of the number of controllers, wherein the second one of the number of controllers is associated with a different one of the number of partitions as the first one of the number of controllers;
   c. logically combining selected ones of the number local partitioning bits, thereby resulting in a number of local combined partition bits;
   d. serially transmitting selected ones of the number of local combined partitioning bits from the first one of the number of controllers to the second one of the number of controllers;
   e. logically combining selected ones of the number of local combined partitioning bits, received by the second one of the number of controllers in step (c), and selected ones of the number of remote partitioning bits, thereby resulting in a number of remote combined partitioning bits; and f. serially transmitting selected ones of the number of remote combined partitioning bits from the second one of the number of controllers to selected ones of the associated data processing resources.

* * * * *